(12) United States Patent
Xin et al.

(10) Patent No.: US 11,220,151 B1
(45) Date of Patent: Jan. 11, 2022

(54) SYSTEM AND VALVE ASSEMBLY FOR CONTROLLING A RETRACTABLE AXLE OF A VEHICLE

(71) Applicant: Norgren GT Development LLC, Auburn, WA (US)

(72) Inventors: Scott Xin, Auburn, WA (US); Richard Bailey, Auburn, WA (US); Roman Suter, Auburn, WA (US)

(73) Assignee: Norgren GT Development LLC, Auburn, WA (US)

( * ) Notice: Subject to any disclaimer, the term of this patent is extended or adjusted under 35 U.S.C. 154(b) by 0 days.

(21) Appl. No.: 17/117,947

(22) Filed: Dec. 10, 2020

(51) Int. Cl.
*B60G 17/052* (2006.01)
*F16K 31/06* (2006.01)

(52) U.S. Cl.
CPC ...... *B60G 17/0526* (2013.01); *F16K 31/0606* (2013.01); *B60G 2202/152* (2013.01); *B60G 2500/203* (2013.01)

(58) Field of Classification Search
CPC .......... B60G 17/0526; B60G 2202/152; B60G 2500/203; B60G 17/0155; F16K 31/0606
See application file for complete search history.

(56) References Cited

U.S. PATENT DOCUMENTS

| | | | |
|---|---|---|---|
| 7,959,173 B1 * | 6/2011 | Morroney | F15B 13/06 280/124.157 |
| 9,834,056 B2 * | 12/2017 | Coombs | B60G 17/052 |
| 10,428,933 B2 * | 10/2019 | Mills | F15B 13/085 |
| 2003/0146661 A1 * | 8/2003 | Hatch | F16D 48/02 303/119.3 |
| 2011/0101257 A1 * | 5/2011 | Morris | B60G 17/0525 251/129.01 |

FOREIGN PATENT DOCUMENTS

| | | |
|---|---|---|
| GB | 2282111 A | 3/1995 |
| GB | 2288771 | 11/1995 |
| KR | 1020050038691 A | 4/2005 |
| WO | WO 2020/163809 A1 | 8/2020 |

OTHER PUBLICATIONS

Search Report prepared by the UK Intellectual Property Office in application No. GB2101359.4 dated Jul. 20, 2021.

* cited by examiner

*Primary Examiner* — Faye M Fleming
(74) *Attorney, Agent, or Firm* — McDonnell Boehnen Hulbert & Berghoff LLP

(57) ABSTRACT

An example valve assembly includes a mounting plate having an inlet port configured to be fluidly coupled to a source of fluid; a pilot supply valve mounted to the mounting plate, wherein the pilot supply valve comprises (i) an inlet port fluidly coupled to the inlet port of the mounting plate, and (ii) a first outlet port configured to be fluidly coupled to a pilot port of a main valve; and a pilot exhaust valve mounted to the mounting plate, wherein the pilot exhaust valve comprises (i) a vent port, (ii) a second outlet port that is fluidly coupled to the first outlet port of the pilot supply valve.

20 Claims, 16 Drawing Sheets

US 11,220,151 B1

SYSTEM AND VALVE ASSEMBLY FOR CONTROLLING A RETRACTABLE AXLE OF A VEHICLE

BACKGROUND

Some vehicles, such as trucks, have multiple axles with two or four tires per axle to spread the weight over the road surface. There is a maximum weight per type of axle, and therefore, to carry heavy weights, trucks have multiple axles. However, when the truck or trailer is empty, the weight might not sufficient to justify using all the axles.

A retractable axle or lift axle of a truck is an axle that can be raised when the truck is not carrying a heavy load or is empty so that its tires are not touching the road surface. This improves fuel economy, reduces maintenance, and reduces tire wear. When the vehicle is carrying higher loads, the axle can be lowered so that its tires are touching the road surface and the axle can carry load to facilitate distributing the load among a larger number of axles.

The retractable axle can be lowered and retracted using a fluid system. Such a fluid system can involve using a valve assembly to direct fluid to and from actuating mechanisms that can lower and retract the axle. It may be desirable to configure the valve assembly in a modular manner to facilitate controlling one or more retractable axles as desired based on the type and size of the truck.

In some applications, it may be desirable to keep the valves of the valve assembly operating in a given commanded state when an actuation signal is removed. This way, if there is a failure that causes the actuation signal to be cut off, the fluid system operates safely at the commanded state of the valve. It is with respect to these and other considerations that the disclosure made herein is presented.

SUMMARY

The present disclosure describes implementations that relate to system and valve assembly for controlling a retractable axle of a vehicle.

In a first example implementation, the present disclosure describes a valve assembly. The valve assembly includes: (i) a mounting plate having an inlet port configured to be fluidly coupled to a source of fluid; (ii) a pilot supply valve mounted to the mounting plate, wherein the pilot supply valve comprises (a) an inlet port fluidly coupled to the inlet port of the mounting plate, and (b) a first outlet port configured to be fluidly coupled to a pilot port of a main valve; and (iii) a pilot exhaust valve mounted to the mounting plate, wherein the pilot exhaust valve comprises (a) a vent port, (b) a second outlet port that is fluidly coupled to the first outlet port of the pilot supply valve. The valve assembly is configured to operate in: (i) a first state at which the pilot supply valve allows a pilot fluid signal to flow from the inlet port to the first outlet port to actuate the main valve, while the pilot exhaust valve blocks fluid flow from the second outlet port to the vent port to allow the pilot fluid signal to flow to the pilot port of the main valve to actuate the main valve, and (ii) a second state at which the pilot supply valve blocks fluid flow from the inlet port to the first outlet port, while the pilot exhaust valve allows fluid flow from the second outlet port to the vent port to drain the pilot port of the main valve, thereby unactuating the main valve.

In a second example implementation, the present disclosure describes a valve assembly. The valve assembly includes: (i) a mounting plate having an inlet port configured to be fluidly coupled to a source of fluid; (ii) a pilot supply valve mounted to the mounting plate, wherein the pilot supply valve comprises (a) an inlet port fluidly coupled to the inlet port of the mounting plate, (b) a first outlet port configured to be fluidly coupled to a pilot port of a main valve, (c) a first solenoid coil, (d) a first armature slidably accommodated within the first solenoid coil, (e) a first magnet fixedly disposed within the first solenoid coil, wherein the first magnet applies a magnetic force on the first armature in a distal direction, and (f) a first spring applying a biasing force on the first armature in a proximal direction; and (iii) a pilot exhaust valve mounted to the mounting plate, wherein the pilot exhaust valve comprises (a) a vent port, (b) a second outlet port that is fluidly coupled to the first outlet port of the pilot supply valve, (c) a second solenoid coil, (d) a second armature slidably accommodated within the second solenoid coil, (e) a second magnet fixedly disposed within the second solenoid coil, wherein the second magnet applies a magnetic force on the second armature in the distal direction, and (f) a second spring applying a biasing force on the second armature in the proximal direction.

In a third example implementation, the present disclosure describes a system. The system includes a main valve comprising: (i) a supply port configured to be fluidly coupled to a source of fluid, (ii) a reservoir port configured to be fluidly coupled to a reservoir of fluid, (iii) a first workport configured to be fluidly coupled to axle-lifting bags configured to lift a retractable axle of a vehicle when inflated, (iv) a second workport configured to be fluidly coupled to axle-lowering bags configured to lower the retractable axle of the vehicle when inflated, and (v) a pilot port, wherein the main valve is configured to operate in: (i) an unactuated state, when the pilot port is drained, at which the supply port is fluidly coupled to the first workport and the reservoir port is fluidly coupled to the second workport, thereby allowing the axle-lifting bags to be inflated, and (ii) an actuated state, when a pilot fluid signal is provided to the pilot port, at which the supply port is fluidly coupled to the second workport and the reservoir port is fluidly coupled to the first workport, thereby allowing the axle-lowering bags to be inflated. The system also includes the valve assembly of the first example implementation or the second example implementation. The system further includes a controller configured to perform operations comprising: (i) operating the valve assembly in a first state at which the pilot supply valve allows the pilot fluid signal to flow from the inlet port to the first outlet port, while the pilot exhaust valve blocks fluid flow from the second outlet port to the vent port to allow the pilot fluid signal to flow to the pilot port of the main valve to operate the main valve in the actuated state, and (ii) operating the valve assembly in a second state at which the pilot supply valve blocks fluid flow from the inlet port to the first outlet port, while the pilot exhaust valve allows fluid flow from the second outlet port to the vent port to drain the pilot port of the main valve to operate the main valve in the unactuated state.

In a fourth example implementation, the present disclosure describes a vehicle. The vehicle includes a retractable axle; axle-lifting bags configured to lift the retractable axle when inflated; axle-lowering bags configured to lower the retractable axle of the vehicle when inflated; a source of fluid; and a reservoir of fluid. The vehicle also includes the main valve of the third example implementation. The vehicle also includes the valve assembly of the first example implementation or the second example implementation. The vehicle further includes the controller of the third example implementation.

In a fifth example implementation, the present disclosure describes a method including operations performed by the controller of the third example implementation or the fourth example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Vehicles, such as some dump trucks and trailers, may be configured with a retractable axle (also referred to as a lift or drop axle), which may be mechanically raised or lowered. The axle is lowered to increase the weight capacity, or to distribute the weight of the cargo over more wheels. When not needed, the axle is lifted off the ground to save wear on the tires and axle, and to increase traction in the remaining wheels. The terms "lift," "retract," and "raise" an axle are used interchangeably. Similarly, the terms "lower" and "deploy" an axle are used interchangeably.

Figure 1:
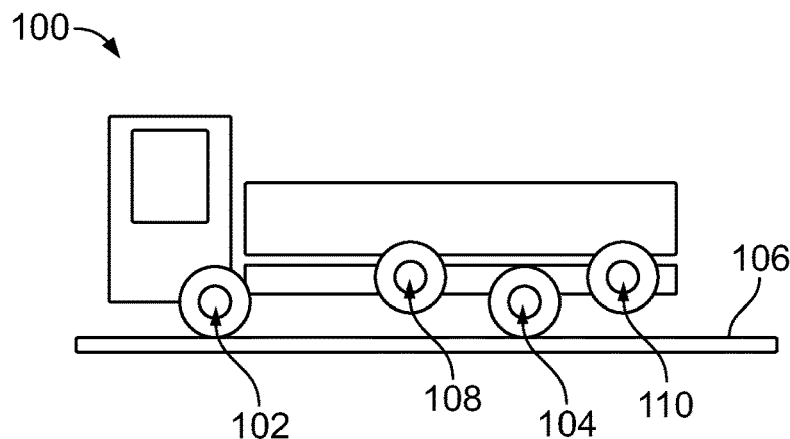
FIG. 1 illustrates a vehicle having retractable axles, in accordance with an example implementation.

FIG. 1 illustrates a vehicle 100 having retractable axles, in accordance with an example implementation. The vehicle 100 has a front axle 102 and a rear axle 104 having respective wheels that permanently contact a road surface 106. The vehicle 100 also has a first retractable axle 108 and a second retractable axle 110 that can be raised and lowered based on the weight that the vehicle 100 is carrying. For example, in FIG. 1, the vehicle 100 might not be carrying cargo, and therefore both retractable axles 108, 110 are raised off the road surface 106 (i.e., their wheels do not contact the road surface 106 and the retractable axles 108, 110 are not carrying weight). When the vehicle 100 is loaded with cargo, one or both of the retractable axles 108, 110 can be lowered to distribute the weight of the cargo over more wheels.

Figure 2:
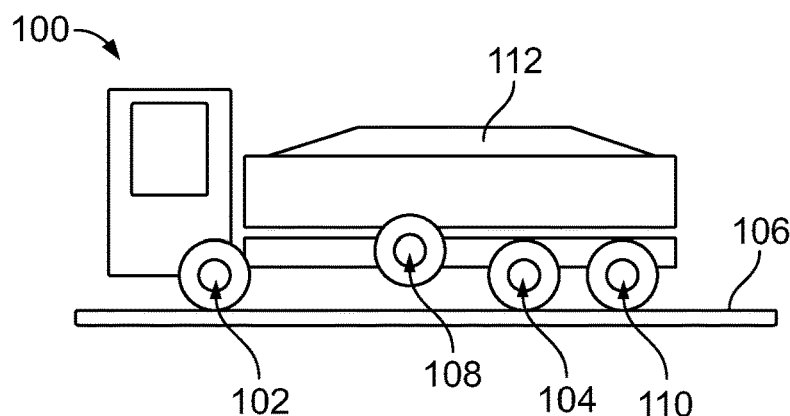
FIG. 2 illustrates the vehicle of FIG. 1 with a retractable axle lowered, in accordance with an example implementation.

FIG. 2 illustrates the vehicle 100 with the retractable axle 110 lowered, in accordance with an example implementation. If the vehicle 100 is loaded with a cargo 112 having a medium weight, one of the retractable axles 108, 110 is lowered to distribute the weight of the cargo 112 between three axles (the front axle 102, the rear axle 104, and the retractable axle 110), rather than two axles.

Figure 3:
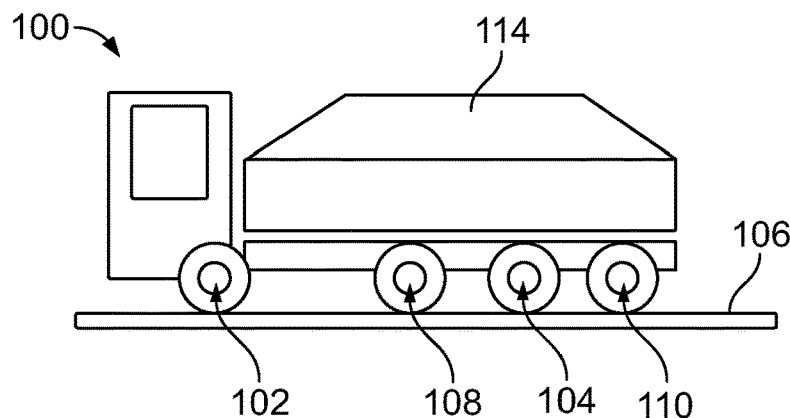
FIG. 3 illustrates the vehicle of FIG. 1 with two retractable axles lowered, in accordance with an example implementation.

FIG. 3 illustrates the vehicle 100 with both the retractable axle 108 and the retractable axle 110 lowered, in accordance with an example implementation. If the vehicle 100 is loaded with a cargo 114 having a large weight, both of the retractable axles 108, 110 are lowered to distribute the weight of the cargo 114 between four axles (the front axle 102, the rear axle 104, and the retractable axles 108, 110), rather than two or three axles.

The configuration shown in FIGS. 1-3 is an example configuration and is not meant to be limiting. For instance, in some vehicles, three retractable axles can be used. In another example, a truck may have only one retractable axle. Further the location of the retractable axles can vary. For instance, while the rear axle 104 is interposed between the retractable axles 108, 110, in other examples, the retractable axles 108, 110 can be interposed between the front axle 102 and the rear axle 104.

Several mechanisms can be used to lift and lower the retractable axles 108, 110. For example, the vehicle 100 can have a fluid system to lower and raise the retractable axles 108, 110. The term "fluid" is used herein generally to indicate air, gas, liquid, hydraulic fluid, water, etc. In the description below, air is used as an example; however, it should be understood that the valves and system described herein may also be used with other fluid types.

Figure 4:
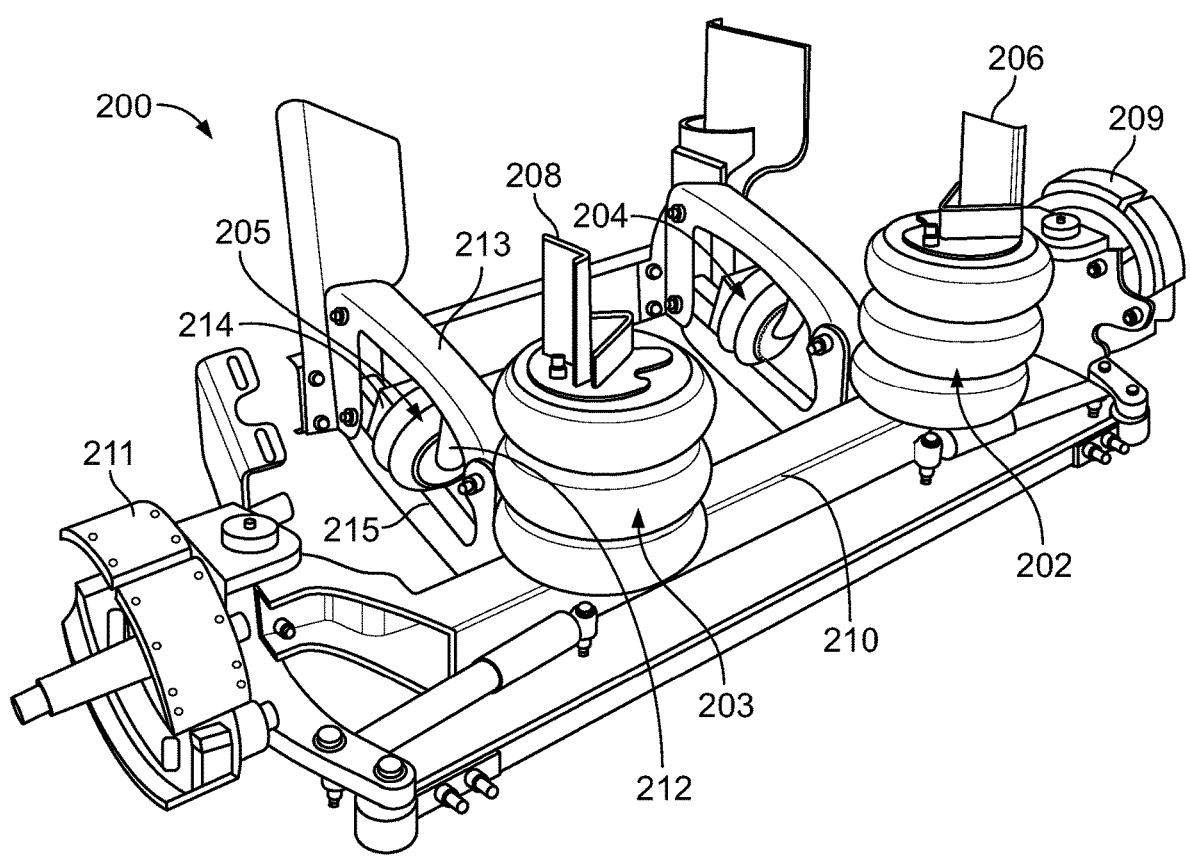
FIG. 4 illustrates a perspective view of a retractable axle assembly, in accordance with an example implementation.

FIG. 4 illustrates a perspective view of a retractable axle assembly 200, in accordance with an example implementation. The wheels of the retractable axle assembly 200 are not shown to reduce visual clutter in the drawing.

In the example implementation of FIG. 4, the retractable axle assembly 200 includes a first set of axle-lowering bags 202 and a second set of axle-lowering bags 203. The retractable axle assembly 200 also includes a first set of axle-lifting bags 204 and a second set of axle-lifting bags 205. The bags can be referred to as airbags or airsprings when compressed air is used to inflate and deflate the bags.

Upper ends of the axle-lowering bags 202, 203 are respectively coupled to mounting members 206, 208. Lower ends of the axle-lowering bags 202, 203 are respectively coupled to a retractable axle 210. The retractable axle 210 represents the retractable axle 108 or the retractable axle 110 of the vehicle 100, for example. Wheels hubs 209, 211 are coupled to the retractable axle 210 for attaching wheels (not shown).

The mounting members 206, 208 can be secured to a frame of the vehicle 100. With this configuration, upper ends of the axle-lowering bags 202, 203 are fixed to the frame of the vehicle 100, while the lower ends thereof can move up and down with the retractable axle 210 based on the inflation state of the axle-lowering bags 202, 203.

One end of the axle-lifting bags 205 is coupled to a rigid member 212, which is coupled to support member 213, which in turn is coupled to a frame of the vehicle 100. The other end of the axle-lifting bags 205 is coupled to a pivot member 214, which is coupled to the retractable axle 210 via member 215. The axle-lifting bags 204 are configured similarly.

With this configuration, inflating the axle-lowering bags 202, 203 while deflating the axle-lifting bags 204, 205 lowers the retractable axle 210. On the other hand, inflating the axle-lifting bags 204, 205 while deflating the axle-lowering bags 202, 203 raises or lifts the retractable axle 210.

Figure 5A:
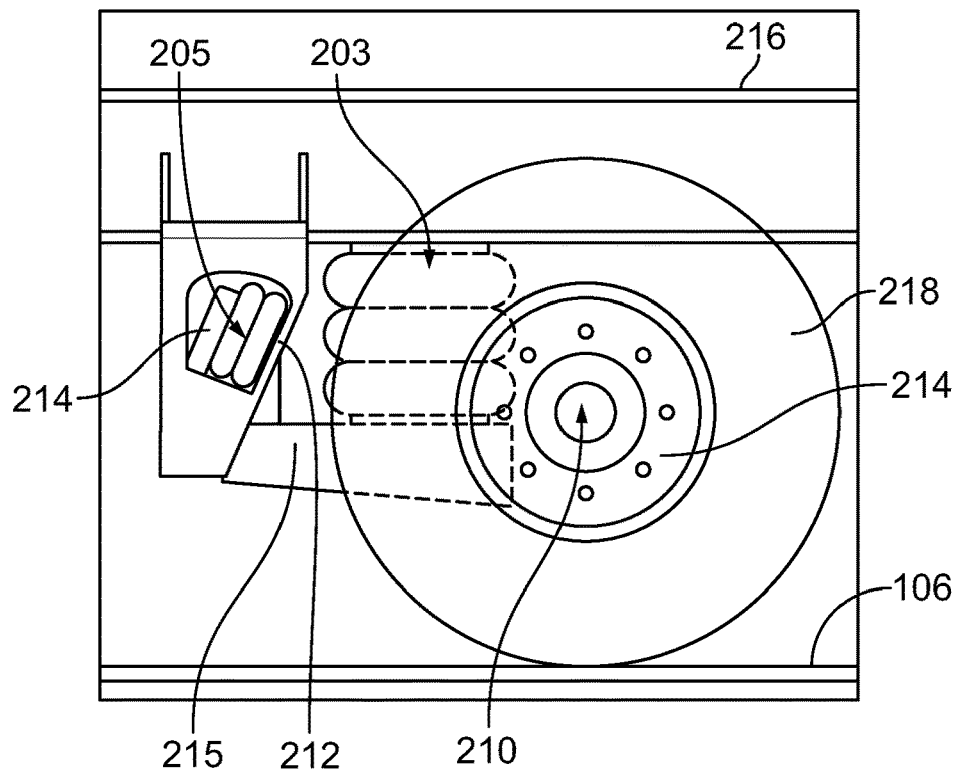
FIG. 5A illustrates an axle in a lowered position, in accordance with an example implementation.
Figure 5B:
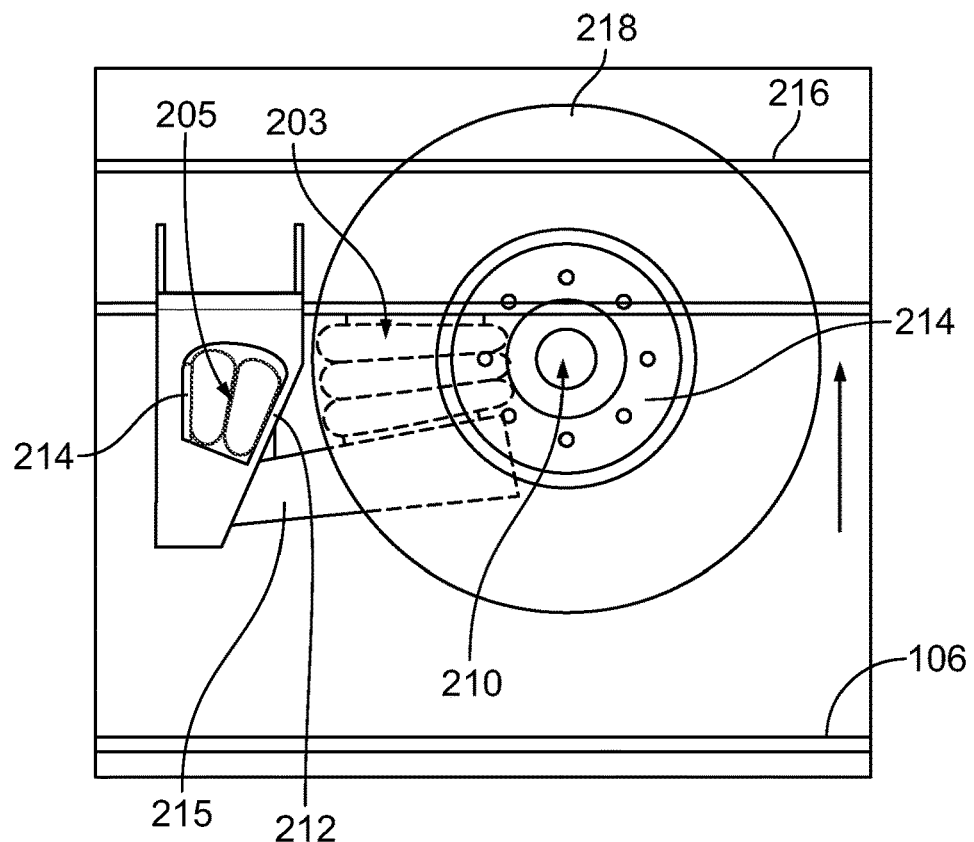
FIG. 5B illustrates an axle in a lifted position, in accordance with an example implementation.

FIG. 5A illustrates the retractable axle 210 in a lowered position, and FIG. 5B illustrates the retractable axle 210 in a lifted position, in accordance with an example implementation. Particularly, FIG. 5A illustrates the axle-lowering bags 203 being inflated, whereas the axle-lifting bags 205 are deflated. When the axle-lowering bags 203 is inflated, the retractable axle 210 is lowered because the upper end of the axle-lowering bags 203 is fixedly attached to a frame 216, while its lower end is coupled to the retractable axle 210. As such, a wheel 218 coupled to the wheel hub 211 is lowered to contact the road surface 106.

FIG. 5B illustrates the axle-lowering bags 203 being deflated, whereas the axle-lifting bags 205 are inflated. When the axle-lifting bags 205 are inflated, they push the pivot member 214, which rotates counter-clockwise, causing the member 215 to also rotate, lifting the retractable axle 210 and the wheel 218 off the road surface 106.

The vehicle 100 includes a fluid system that provides fluid (e.g., air) to the bags to inflate them and exhaust fluid from the bags to deflate them. For example, the vehicle 100 can include an electronic controller, and a driver of the truck can provide an input (e.g., via a button) to the controller indicating a request to raise or lower the retractable axle 210. Responsively, the controller provides electric signals to valves of the fluid system to direct fluid to or exhaust fluid from the bags. In another example, the controller can automatically determine whether to deploy the retractable axle 210 based on measuring the weight of the cargo of the vehicle 100.

Figure 6:
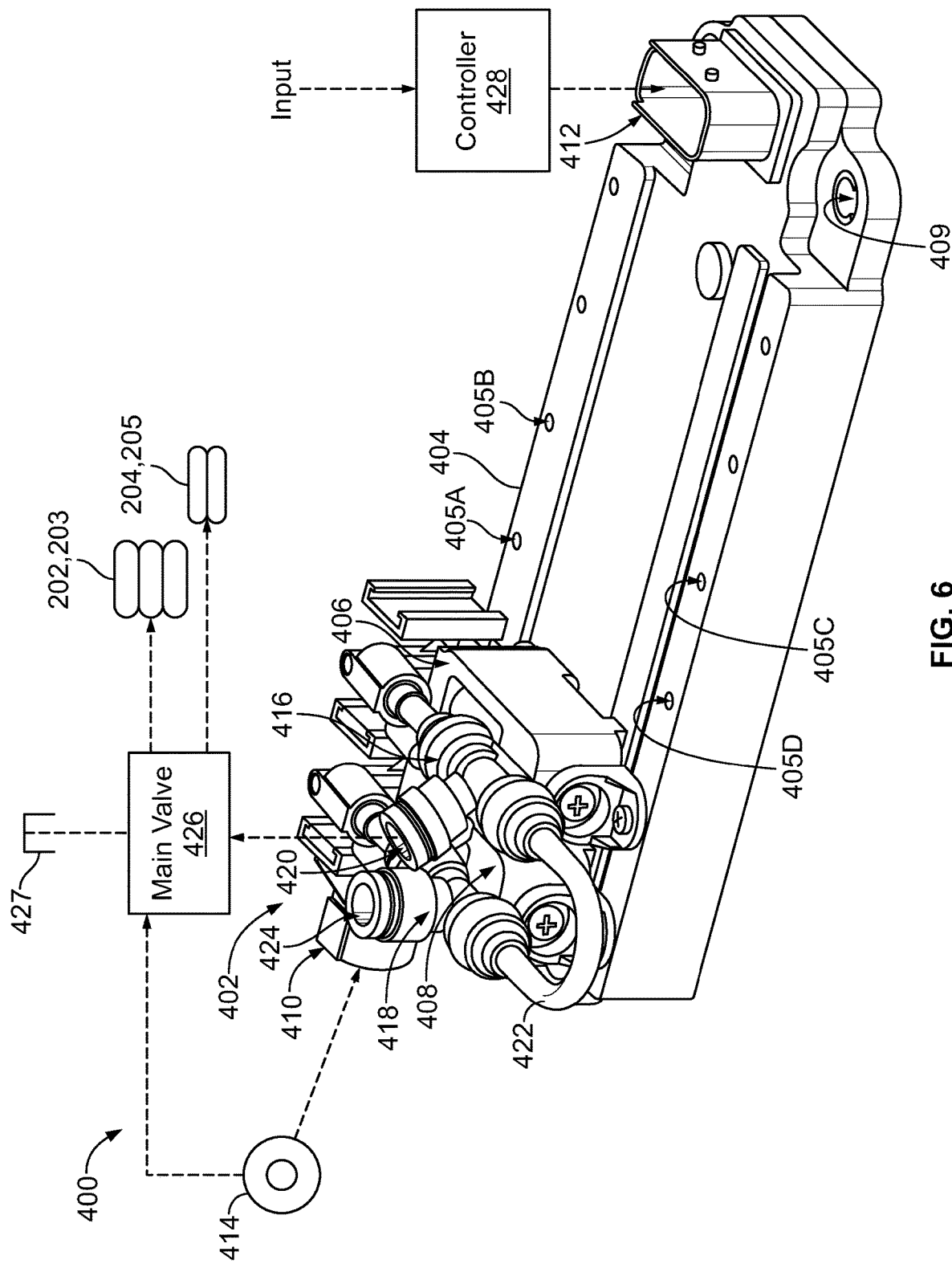
FIG. 6 illustrates a system including a valve assembly for controlling a retractable axle, in accordance with an example implementation.

FIG. 6 illustrates a system 400 including a valve assembly 402 for controlling a retractable axle, in accordance with an example implementation. For example, the system 400 and the valve assembly 402 can control lifting and lowering of the retractable axle 210 (which represents the retractable axles 108, 110).

The valve assembly 402 includes a mounting plate 404. The mounting plate 404 can also be referred to as a manifold. The mounting plate 404 includes a plurality of valve mounting holes, such as valve mounting holes 405A, 405B, 405C, 405D, disposed in two opposite rows. Each two opposite valve mounting holes facilitate mounting a pilot valve to the mounting plate 404, such as pilot supply valve 406 and pilot exhaust valve 408, via respective fasteners.

The mounting plate 404 also includes vehicle mounting holes, such as vehicle mounting hole 409. The vehicle mounting holes facilitate attaching the mounting plate 404 and the valve assembly 402 to the vehicle 100 via respective fasteners disposed through the vehicle mounting holes.

The mounting plate 404 also includes an inlet fitting 410. The inlet fitting 410 is coupled to an inlet port of the mounting plate 404 to facilitate providing inlet fluid through an inlet channel within the mounting plate 404 (see FIG. 18).

The mounting plate 404 further includes an electric connector 412. The electric connector 412 includes multiple pins and is configured to receive an electric plug to provide and receive electric signals. The mounting plate 404 can further include a printed circuit board (PCB) therein or electric wires that electrically connect the pins of the electric connector 412 to electric terminals of the pilot supply valve 406 and the pilot exhaust valve 408.

The system 400 includes a source 414 of fluid that is fluidly coupled to the inlet fitting 410, which is coupled to the inlet port of the mounting plate 404. The source 414 can, for example, be a pump, air compressor, an accumulator, etc. The fluid from the source 414 is communicated via the inlet fitting 410 to the inlet port of the mounting plate 404, and then to inlet ports of the pilot supply valves (e.g., the pilot supply valve 406) coupled to the mounting plate 404.

The valve assembly 402 includes a supply fitting 416 coupled to an outlet port of the pilot supply valve 406. The valve assembly 402 also includes and an exhaust fitting 418 coupled to an outlet port of the pilot exhaust valve 408. The supply fitting 416 has a pilot supply port 420, and the pilot supply valve 406 is configured to provide a pilot fluid signal through the pilot supply port 420.

As depicted in FIG. 6, the supply fitting 416 and the exhaust fitting 418 are fluidly coupled via a fluid line or hose 422 such that the outlet ports of the pilot supply valve 406 and the pilot exhaust valve 408 are fluidly coupled. The exhaust fitting 418 has a port 424 that can be coupled to a pressure sensor, for example, to provide an indication of a pressure level of the pilot fluid signal. The term "fluidly coupled" is used throughout herein to indicate that fluid can flow or be communicated between two fluid passages, chambers, ports, or openings.

The system 400 includes a main valve 426 that is configured to supply fluid to, and receive fluid from, the axle-lowering bags 202, 203 and the axle-lifting bags 204, 205. In an example, as described in more detail below with respect to FIGS. 19-20, the main valve 426 is configured as a directional control valve that is pilot-actuated via the pilot fluid signal from the pilot supply valve 406.

Based on the actuation state of the main valve 426, the main valve 426 allows fluid flow from the source 414 therethrough to inflate the axle-lowering bags 202, 203 or the axle-lifting bags 204, 205. The main valve 426 also allows for deflation of the axle-lowering bags 202, 203 or the axle-lifting bags 204, 205 by allowing fluid from the axle-lowering bags 202, 203 or the axle-lifting bags 204, 205 therethrough to a reservoir 427 of fluid. In examples, the reservoir 427 represents the atmosphere or the external environment of the vehicle 100.

The system 400 further includes a controller 428 that is configured to provide electric signals to the electric connector 412 based on input signals (e.g., operator commands or commands from a main controller of a vehicle). For example, an operator may press a button to lower or lift an axle, and an input signal is thus provided to the controller 428, which operates the valve assembly 402 to lift or lower the axle. In another example, the controller 428 (or another main controller of the vehicle 100) may automatically determine based on the weight of the cargo whether deploying a retractable axle is required, and accordingly provide an input signal to the controller 428 to operate the valve assembly 402.

The controller 428 is an electronic controller that includes one or more processors or microprocessors and may include data storage (e.g., memory, transitory computer-readable medium, non-transitory computer-readable medium, etc.). The data storage may have stored thereon instructions that, when executed by the one or more processors of the controller 428, cause the controller 428 to perform the operations described herein.

The system 400 and the mounting plate 404 are configured to be modular so as to accommodate one or more retractable axles based on the type and configuration of the vehicle (e.g., the truck). For example, a truck can include one, two, or three retractable axles. As such, the system 400 and the manifold can accommodate a number of valves depending on the number of retractable axles.

Figure 7:
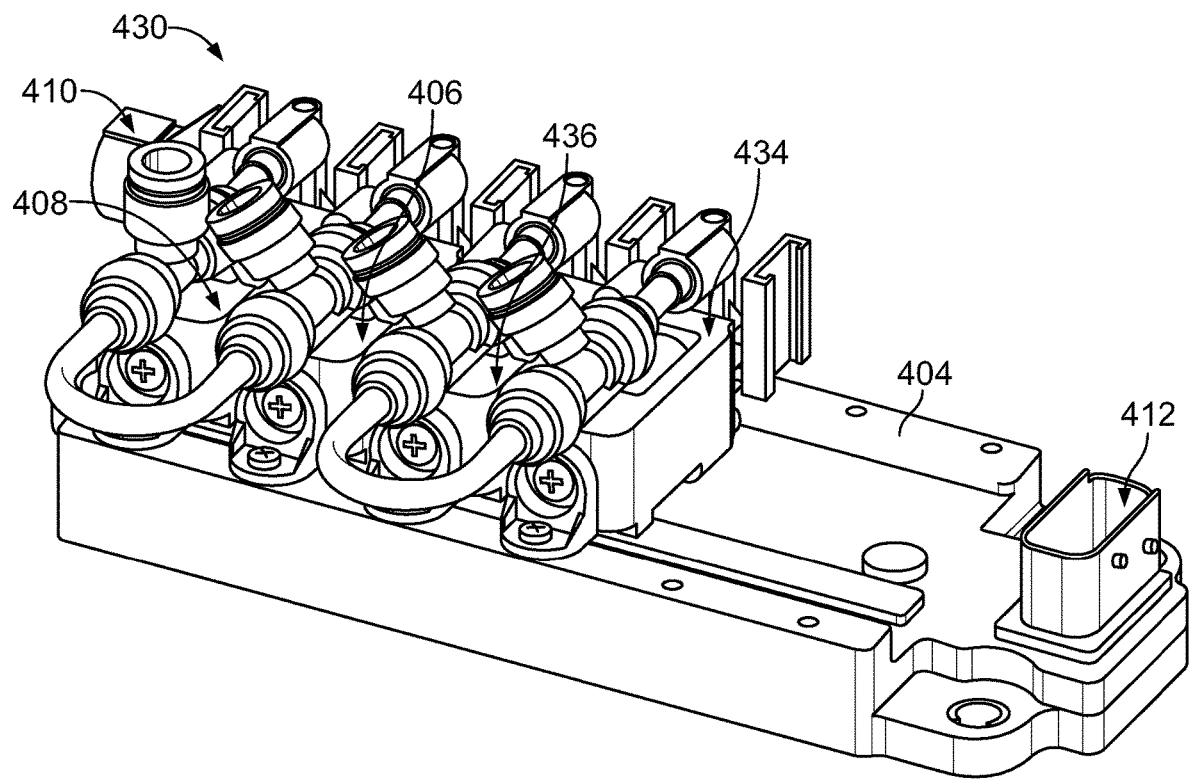
FIG. 7 illustrates a valve assembly configured to control two retractable axles, in accordance with an example implementation.
Figure 8:
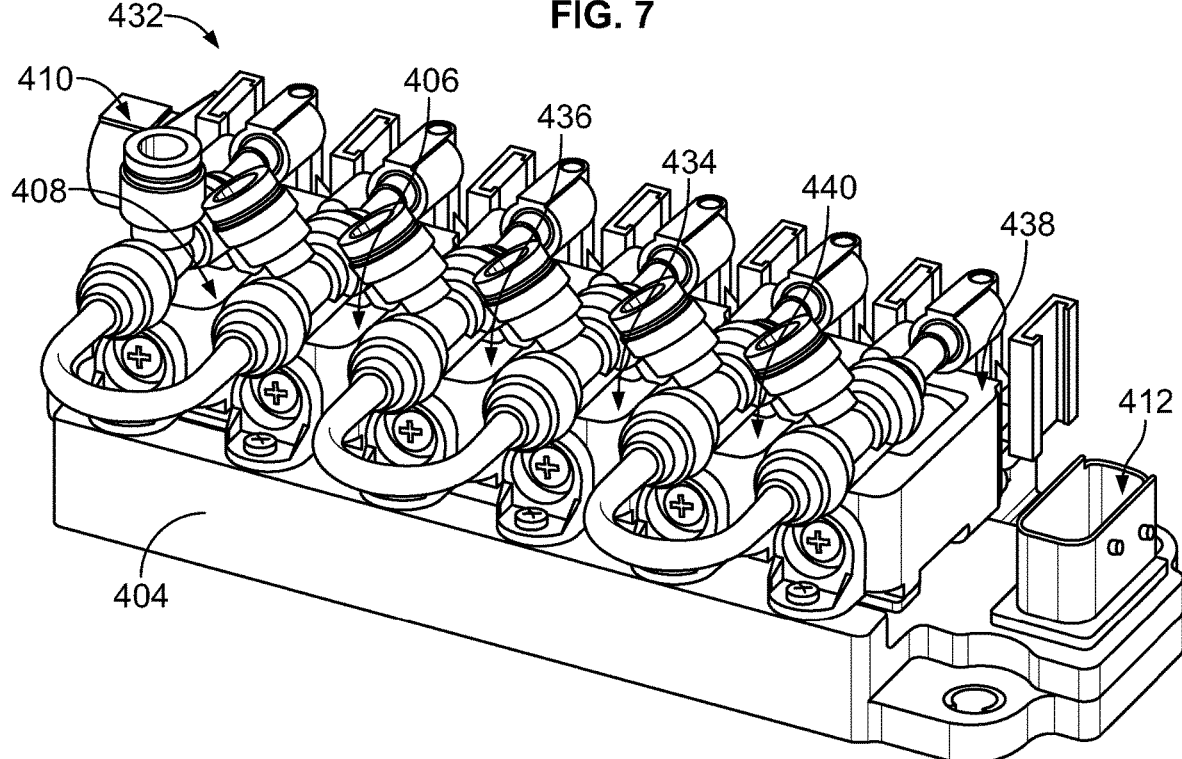
FIG. 8 illustrates a valve assembly configured to control three retractable axles, in accordance with an example implementation.

FIG. 7 illustrates a valve assembly 430 configured to control two retractable axles, and FIG. 8 illustrate a valve assembly 432 configured to control three retractable axles, in accordance with example implementations. As shown in FIG. 7, in addition to the pilot supply valve 406, another pilot supply valve 434 is mounted to the mounting plate 404. Also, in addition to the pilot exhaust valve 408, another pilot exhaust valve 436 is mounted to the mounting plate 404. The pilot supply valve 434 and the pilot exhaust valve 436 are configured to control a respective main valve (similar to the main valve 426) to control inflation and deflation of respective axle-lowering bags and axle-lifting bags of a second retractable axle.

In FIG. 8, another pilot supply valve 438 and another pilot exhaust valve 440 are mounted to the mounting plate 404. The pilot supply valve 438 and the pilot exhaust valve 440 are configured to control a respective main valve (similar to the main valve 426) to control inflation and deflation of respective axle-lowering bags and axle-lifting bags of a third retractable axle.

The pilot supply valves 406, 434, 438 and the pilot exhaust valves 408, 436, 440 are configured as magnetically-latched valves. Particularly, once a pilot supply valve or a pilot exhaust valve is actuated to a particular commanded state by an electric signal, the valve remains in the commanded state despite removing or losing the electric signal to the solenoid coil. This way, the valves and the system 400 remain in a desired state if electric power is lost (e.g., if ignition of the truck is turned off).

FIGS. 9-14 illustrate a pilot valve 700 as an example magnetically-latched valve. The pilot supply valves 406, 434, 438 and the pilot exhaust valves 408, 436, 440 are variants of the pilot valve 700 as described below.

Figure 9:
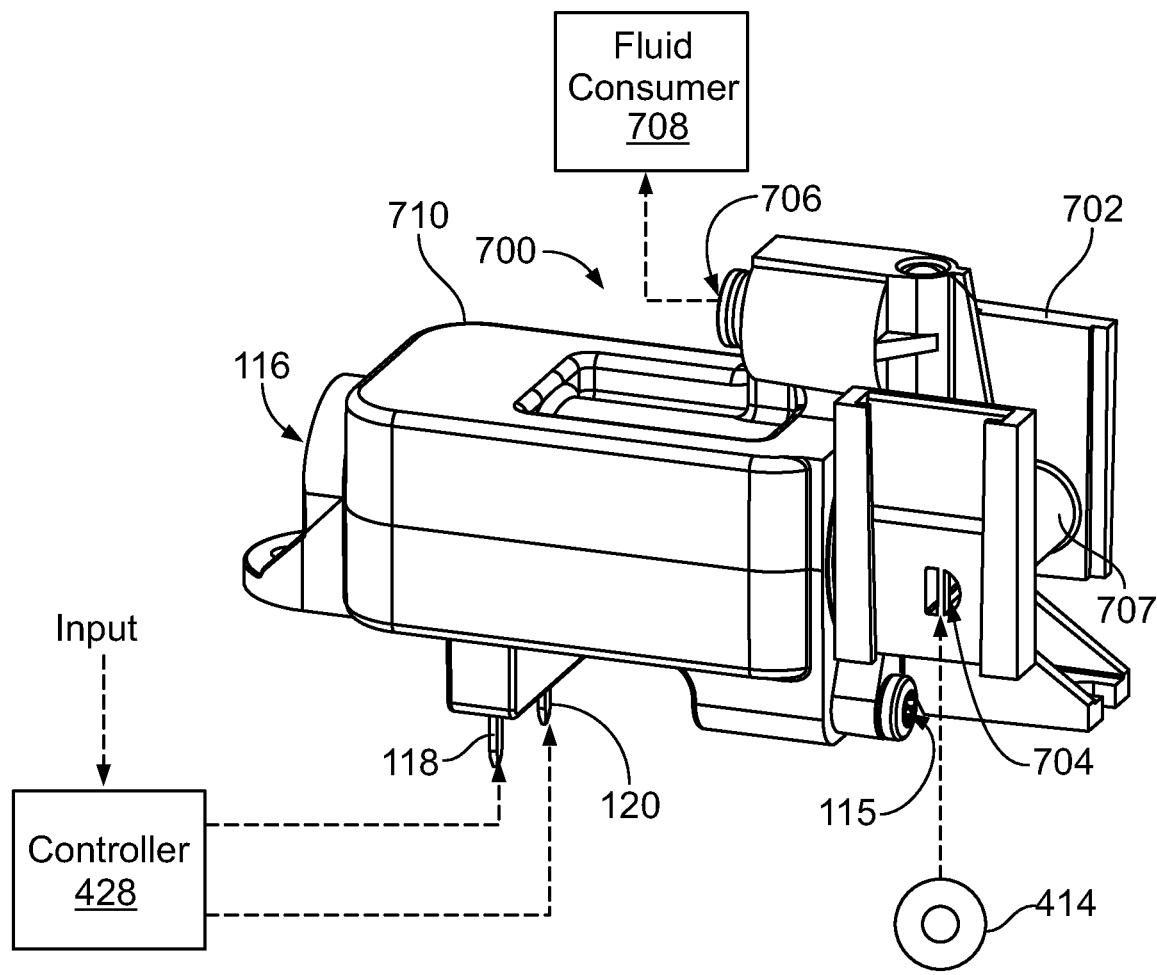
FIG. 9 illustrates a perspective view of a pilot valve, in accordance with an example implementation.

FIG. 9 illustrates a perspective view of the pilot valve 700, in accordance with an example implementation. The pilot valve 700 includes a manifold 702 having a supply or inlet port 704 and an outlet port 706.

In an example, the inlet port 704 can received fluid from a source of fluid such as the source 414. The fluid from the source 414 is communicated via the inlet port 704 through a lateral bore or lateral channel within a cylindrical portion 707 of the manifold 702 (see channel 806 described below with respect to FIG. 15).

The outlet port 706 is configured to be fluidly coupled to a fluid consumer 708. The fluid consumer 708 can for example be the main valve 426. For instance, the pilot valve 700 can provide a pilot fluid signal to actuate the main valve 426

The manifold 702 is coupled to a solenoid coil 710 via fasteners such as screw 115. The solenoid coil 710 is an encapsulated or over-molded coil configured as a valve body or housing that contains other components of the pilot valve 700. The solenoid coil 710 defines an exhaust or vent port 116.

The solenoid coil 710 is electrically-coupled to a terminal 118 and a terminal 120. Electric power provided to the terminals 118, 120 energizes the solenoid coil 710. For example, the controller 428 can provide electric signals to the terminals 118, 120 to actuate the pilot valve 700. The pilot valve 700 controls fluid flow from the source 414 to the fluid consumer 708 based on command signals provided by the controller 428.

Figure 10:
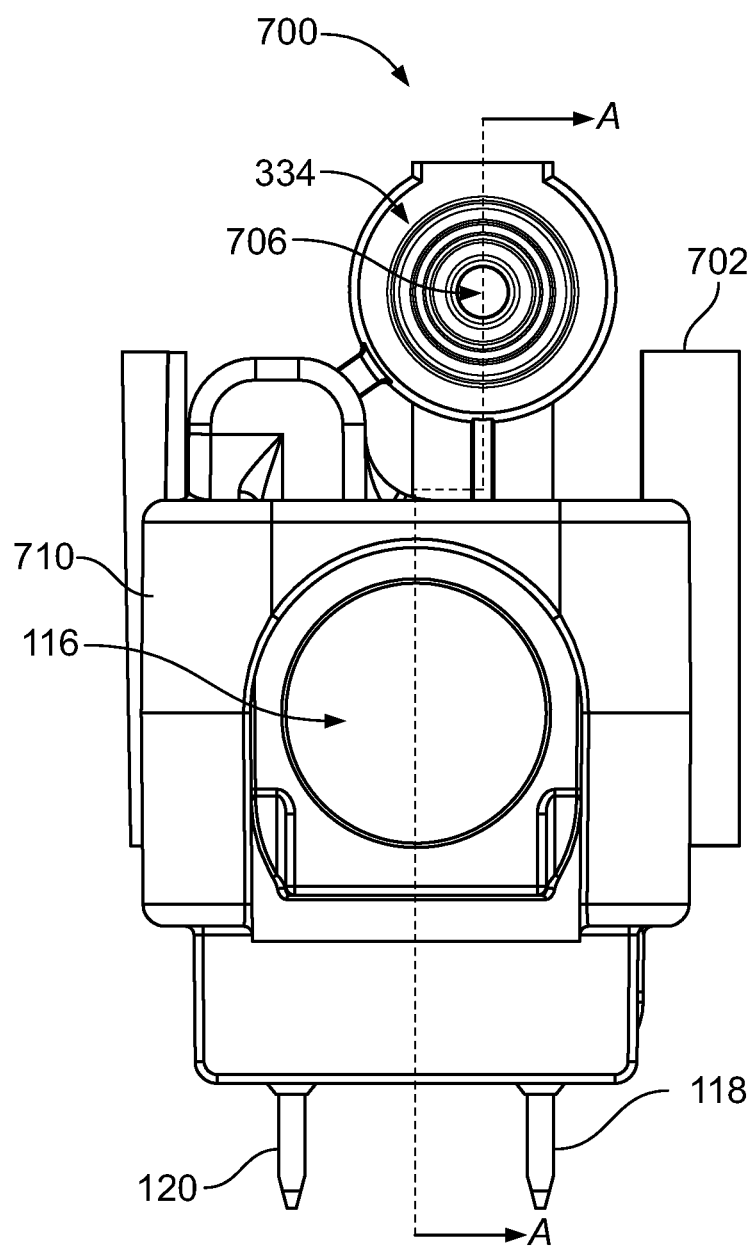
FIG. 10 illustrates a front view of the pilot valve of FIG. 9, in accordance with an example implementation.
Figure 11:
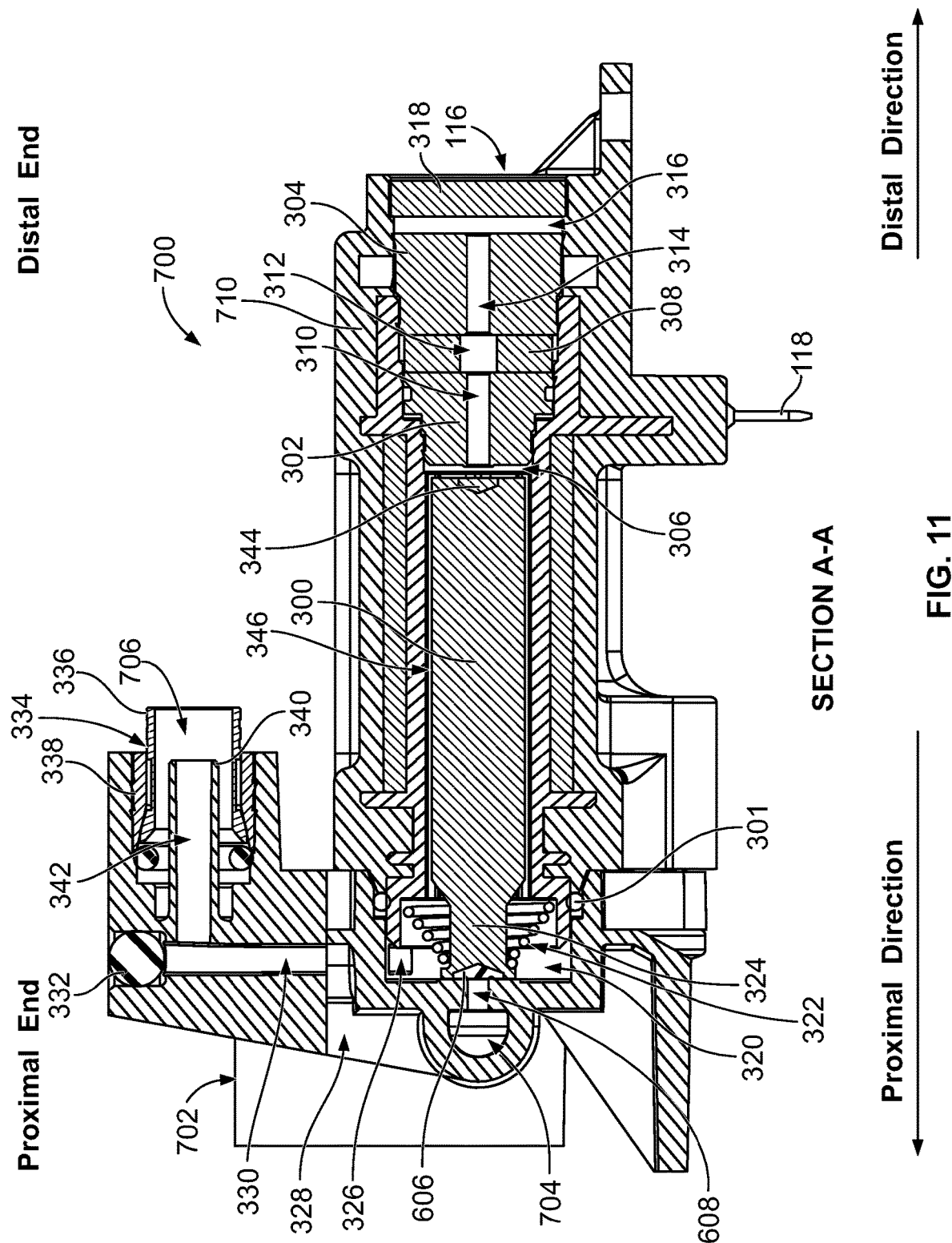
FIG. 11 illustrates a cross-sectional side view of the pilot valve of FIG. 9, in accordance with an example implementation.
Figure 12:
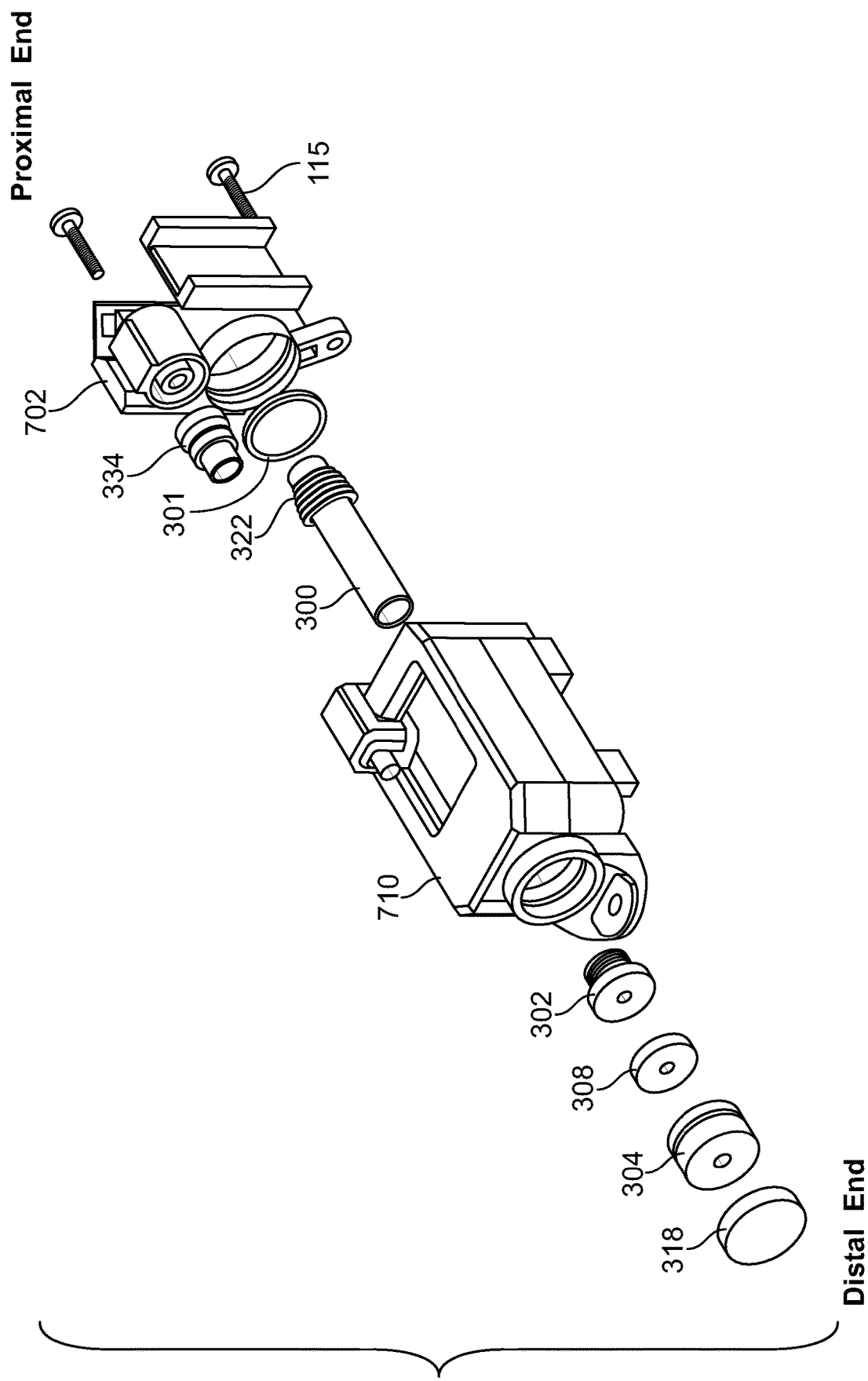
FIG. 12 illustrates a perspective exploded view of the pilot valve of FIG. 9, in accordance with an example implementation.

FIG. 10 illustrates a front view of the pilot valve 700, FIG. 11 illustrates a cross-sectional side view of the pilot valve 700, and FIG. 12 illustrates a perspective exploded view of the pilot valve 700, in accordance with an example implementation. FIGS. 10-12 are described together.

As depicted in FIG. 11, the manifold 702 is coupled to the solenoid coil 710 and a seal 301 (e.g., an O-ring) is disposed between the exterior surface of the solenoid coil 710 and the interior surface of the manifold 702. The seal 301 is configured to seal the manifold 702 to the solenoid coil 710 to preclude leakage to an external environment of the pilot valve 700.

The solenoid coil 710 includes a longitudinal cylindrical cavity therein. The pilot valve 700 includes an armature 300 that is slidably accommodated within the longitudinal cylindrical cavity. The term "slidably accommodated" is used herein to indicate that the armature 300 is axially movable within the solenoid coil 710.

The armature 300 can also be referred to as a plunger or spool. The armature 300 operates as an iron core that enhances the magnetic field and the electromagnetic force generated by the solenoid coil 710 when the solenoid coil 710 is energized. Example materials from which the armature 300 can be made include soft iron, manganese, cobalt, a metallic oxide, iron alloy such as manganese zinc ferrites, etc.

The pilot valve 700 further includes a segmented pole piece comprising an inner or proximal pole piece 302 and an outer or distal pole piece 304. Both the proximal pole piece 302 and the distal pole piece 304 are disposed at a distal side of the armature 300. In the state shown in FIG. 11, the armature 300 is separated from the proximal pole piece 302 by an airgap 306.

The pole pieces 302, 304 are made of a material of high magnetic permeability (e.g., ferromagnetic material) and operate as a magnet when an electric current is applied to the windings of the solenoid coil 710. The pole pieces 302, 304 are fixedly disposed within the solenoid coil 710.

Figure 13:
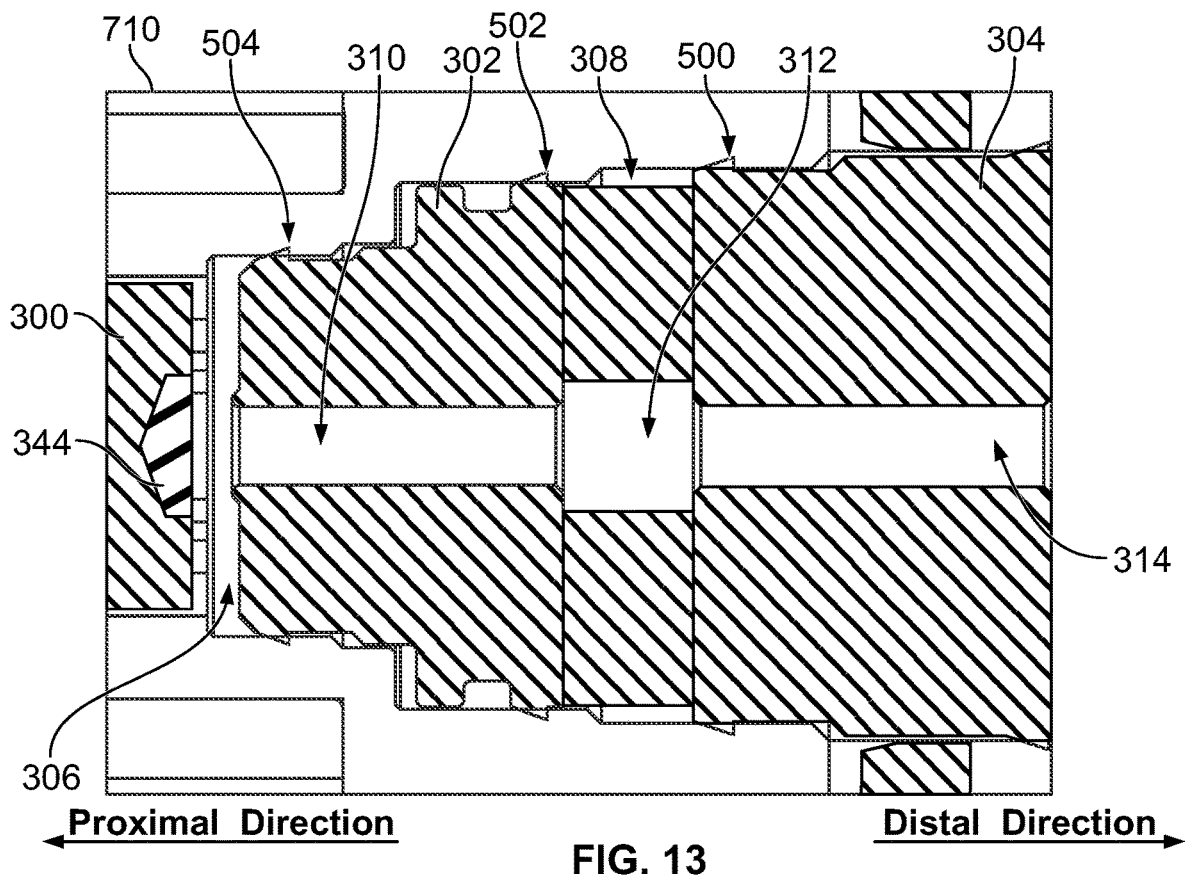
FIG. 13 illustrates a partial cross-sectional bottom view of a distal end of the pilot valve shown in FIG. 11, in accordance with an example implementation.

FIG. 13 illustrates a partial cross-sectional bottom view of a distal end of the pilot valve 700, in accordance with an example implementation. The pole pieces 302, 304 can be fixedly mounted within the longitudinally cavity of the solenoid coil 710 via different methods.

In the example implementation shown in FIG. 13, the pole pieces 302, 304 are barbed, and their barbs allow them to be press-fitted within the solenoid coil 710 and remain secured therein. Particularly, the distal pole piece 304 can have barb 500 and the proximal pole piece has barb 502 and barb 504. Each of the barbs 500-504 can include one or more continuous ridges or bumps on the respective pole piece, and the barbs 500-504 operate as a grip that securely mounts the pole pieces 302, 304 within the solenoid coil 710. As the pole pieces 302, 304 are inserted into the solenoid coil 710 in a proximal direction, the barbs 500-504 can be slightly compressed, and then once the pole pieces 302, 304 are in position, the barbs 500-504 grip the interior surface of the solenoid coil 710 and secure the pole pieces 302, 304 in position. The number, spacing, and configuration of the barbs 500, 502, and 504 depicted in the Figures are an example for illustration, and a different number and spacing of barbs can be used.

Referring back to FIGS. 11-12, the pilot valve 700 further includes a magnet 308 securely interposed between the proximal pole piece 302 and the distal pole piece 304. The magnet 308 is a permanent magnet, i.e., a magnet that retains its magnetism after it is removed from a magnetic field. As an example, the magnet 308 is made of an iron alloy, which in addition to iron, may include aluminum (Al), nickel (Ni), and cobalt (Co). In another example, the magnet 308 is an N40 grade rare-earth magnets such as a neodymium magnet, which is a rare earth permanent magnet made from an alloy of neodymium, iron and boron.

As depicted in the Figures, the magnet 308 is ring-shaped. Further, the magnet 308 is axially-magnetized (as opposed to being diametrically magnetized). In the example implementation described herein, the north pole of the magnet 308 faces or is oriented in the distal direction toward the distal pole piece 304, whereas the south pole of the magnet 308 faces in the proximal direction toward the proximal pole piece 302. As such, the magnet 308 is magnetized through its width or thickness.

With this configuration, the magnet 308 generates a magnetic field that causes a magnetic force to be applied on the armature 300 in the distal direction. The magnitude of the magnetic force applied by the magnet 308 varies with the axial distance between the magnet 308 and the armature 300. Particularly, the magnitude of the magnetic force applied by the magnet 308 on the armature 300 is inversely proportional to the square of the axial distance therebetween.

The proximal pole piece 302 has a channel 310 aligned with a hole 312 of the magnet 308 (which is ring-shaped) and a respective channel 314 of the distal pole piece 304. In an example, the pilot valve 700 can have a porous plug 318. The channel 310, the hole 312, and the channel 314 together form a fluid passage that fluidly couples the airgap 306 to a gap 316 that separates the distal pole piece 304 from the porous plug 318.

The porous plug 318 can be used as a control element of gas flow from the gap 316 to the vent port 116, which is subjected to an external environment of the pilot valve 700. In an example, the porous plug 318 includes a number of tubes with small cross-sectional areas, permitting molecular flow of gas when pressurized gas is communicated to the gap 316. In an example, the pore size of the pores of the porous plug 318 is about 1 micrometer (μm). Such pore size is obtained by sintering nonmetallic (e.g., glass) or metallic powders. In another example, the porous plug 318 is made of a sintered high alumina ceramic material that has controlled porosity to allow for gas flow. As the distal end of the porous plug 318 is subjected to atmospheric pressure or low environmental pressure, the porous plug 318 might not allow reverse flow from the vent port 116 to the gap 316.

As depicted in FIG. 11, an inner chamber 320 is formed between or enclosed by the manifold 702 and the proximal end of the solenoid coil 710. The inner chamber 320 includes a spring 322 disposed about a reduced-diameter portion 324 of the armature 300.

Figure 14:
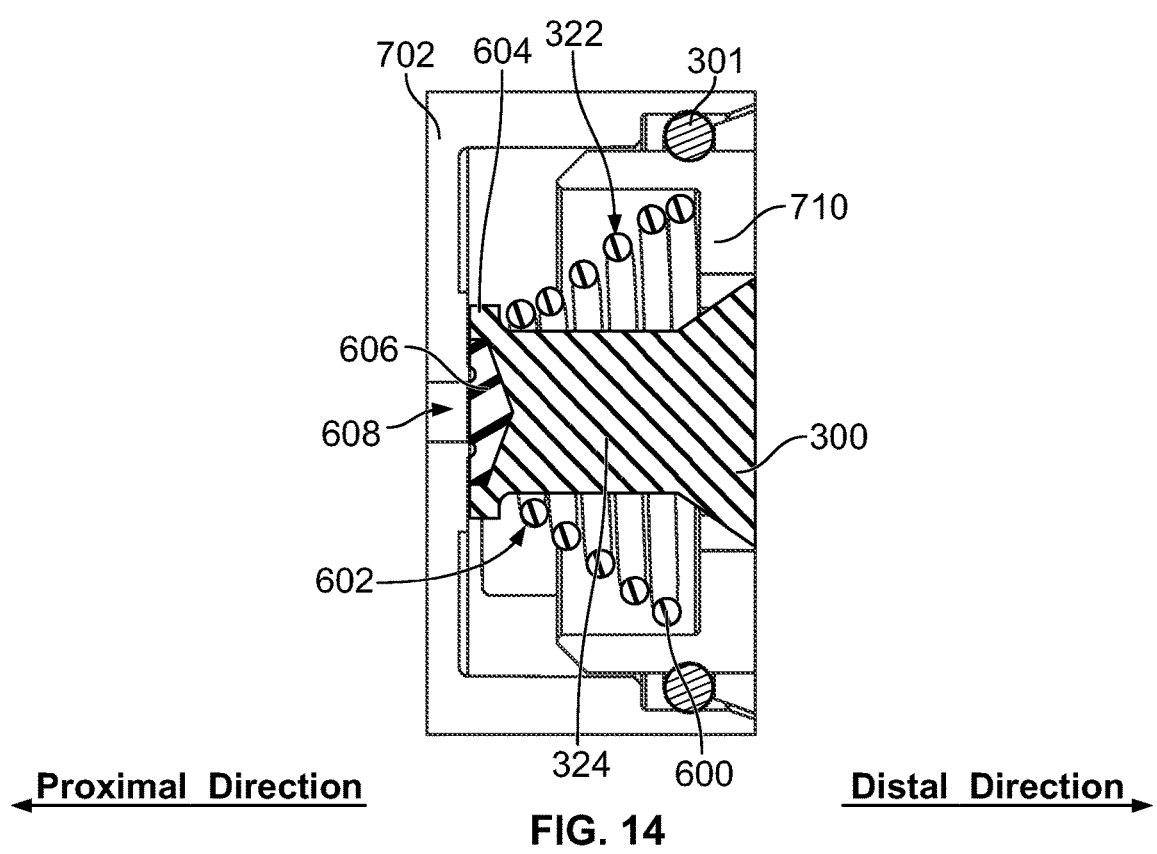
FIG. 14 illustrates a partial cross-sectional bottom view of a proximal end of the pilot valve shown in FIG. 11, in accordance with an example implementation.

FIG. 14 illustrates a partial cross-sectional bottom view of a proximal end of the pilot valve 700, in accordance with an example implementation. In the example implementation depicted in FIG. 14, the spring 322 is configured as a conical spring that is coiled in increasing outer diameter in the distal direction. In other words, the spring 322 is tapered and has the shape of a cone. With this configuration, the spring 322 can apply a particular spring force at a reduced solid height compared to a non-conical spring, and may provide enhanced stability.

A distal end of the spring 322, and particularly a largest-diameter coil 600 thereof, rests against an interior surface of the solenoid coil 710. On the other hand, a proximal end of the spring 322, and particularly a smallest-diameter coil 602 thereof, rests against an armature lip or armature flange 604 formed at the proximal end of the armature 300.

As such, the distal end of the spring 322 is fixedly disposed on the interior surface of the solenoid coil 710, whereas the proximal end of the spring 322 rests against the armature flange 604. This way, the spring 322 applies a biasing spring force on the armature 300 in the proximal direction.

As mentioned above, the magnitude of the magnetic force applied by the magnet 308 on the armature 300 in the distal direction varies with the axial distance between the magnet 308 and the armature 300. In the axial position of the armature 300 depicted in FIGS. 11, 13-14, the spring force of the spring 322 acting on the armature 300 in the proximal direction is greater than the magnetic force applied by the magnet 308 on the armature 300. Therefore, the armature 300 is biased in the proximal direction toward the axial position shown in FIGS. 11, 13-14.

As shown in FIG. 14, the armature 300 includes or houses a seal element 606 disposed within the proximal end of the armature 300. The seal element 606 can be made of a compressible, flexible material. In the axial position of the armature 300 shown in FIGS. 11 and 14, the seal element 606 is compressed under the biasing force of the spring 322 on the armature 300 to effectively seal a longitudinal channel 608 formed in the manifold 702. The longitudinal channel 608 is fluidly coupled to or in communication with the inlet port 704 via the lateral channel formed in the cylindrical portion 707 of the manifold 702 (see FIG. 9).

Referring to FIG. 11, the manifold 702 includes one or more holes or windows, such as window 326, which fluidly couple the inner chamber 320 to an outer chamber 328 formed within the manifold 702. The manifold 702 further includes a channel 330 that is in fluid communication with the outer chamber 328. A ball 332 can be pressed onto the manifold 702 after a drill is used to drill the channel 330.

As depicted in FIG. 11, the pilot valve 700 can include a cartridge 334 coupled to the outlet port 706 of the manifold 702. The cartridge 334 can be coupled to a fitting (e.g., the supply fitting 416 or the exhaust fitting 418) to facilitate coupling a fluid line (e.g., a tube, hose, or pipe) from the fluid consumer 708 (see FIG. 9) to the outlet port 706, thereby fluidly coupling the pilot valve 700 to the fluid consumer 708.

In an example, the cartridge 334 includes a collet 336 that has the opening associated with the outlet port 706. The collet 336 is configured to be inserted into or "ride on" a sleeve 338 to be coupled thereto. For instance, the collet 336 can be threaded into the sleeve 338, or can have barbs that allow the collet 336 to be press-fitted or interference-fitted to the sleeve 338. The sleeve 338 is coupled to the manifold 702 (e.g., via threads or barbed interference fit). The cartridge 334 further includes a tube support 340 that is configured to be coupled to the fluid line connecting the pilot valve 700 to the fluid consumer 708.

The tube support 340 is hollow and has a channel 342 formed therein that is in communication with the channel 330 of the manifold 702. With this configuration, the outlet port 706 is fluidly coupled to the inner chamber 320 via the channel 342, the channel 330, the outer chamber 328, and the window 326. The configuration or the cartridge 334 used herein is an example for illustration. Other types of fitting can be used to fluidly couple the outlet port 706 to the fluid consumer 708.

The pilot valve 700 can be configured to operate in at least two commanded states based on a polarity of the electric power provided to the solenoid coil 710. The pilot valve 700 operates in a first commanded state when direct current (DC) electric power having a first electric polarity is provided to the solenoid coil 710. For example, DC power or a DC signal with the first electric polarity is provided to the pilot valve 700 when the positive terminal of a power source (e.g., a battery) is connected to the terminal 120 while the negative terminal of the power source is connected to the terminal 118. In other words, the DC signal with the first polarity is provided to the pilot valve 700 when the controller 428 communicates the DC signal to the pilot valve 700 such that the positive voltage of the DC signal is applied to the terminal 120 while the negative voltage is applied or connected to the terminal 118.

When the DC signal with the first polarity is provided through the windings of the solenoid coil 710, a magnetic field is generated. The pole pieces 302, 304 direct the magnetic field through the airgap 306 toward the armature 300, which is movable and is attracted toward the pole pieces 302, 304. In other words, when an electric current with the first polarity is applied to the solenoid coil 710, the generated magnetic field forms a north and south pole in the pole pieces 302, 304 and the armature 300, and therefore the pole pieces 302, 304 and the armature 300 are attracted to each other. Because the pole pieces 302, 304 are fixed while the armature 300 is movable, the armature 300 is attracted to the pole piece 302, 304 and is movable across the airgap 306 toward the pole pieces 302, 304. Thus, when the DC signal with the first polarity is provided to the solenoid coil 710, a solenoid force acting in the distal direction is generated and is applied to the armature 300, thereby attracting the armature 300 toward the pole pieces 302, 304, i.e., the armature 300 is attracted toward the distal direction.

When the solenoid force overcomes the biasing force of the spring 322 and any friction forces, the armature 300 moves axially in the distal direction. As the armature 300 moves in the distal direction, the spring 322 is compressed and its biasing force acting in the proximal direction increases. However, as the armature 300 moves in the distal direction, it becomes closer to the magnet 308, and therefore the magnetic force applied by the magnet 308 on the armature 300 in the distal direction increases.

Thus, three forces are acting on the armature 300: (i) the biasing force of the spring 322 acting in the proximal direction, (ii) the electromagnetic force or solenoid force generated by energizing the solenoid coil 710 (with the first polarity DC signal) acting in the distal direction, and (iii) the magnetic force of the magnet 308 acting in the distal direction.

As the armature 300 moves closer to the magnet 308, the combined solenoid and magnetic forces cause the armature 300 to traverse the airgap 306, and a distal end face of the armature 300 rests against the proximal end face of the proximal pole piece 302. Also, as the armature 300 moves closer to the magnet 308 and the magnetic force of the magnet 308 increases, the magnetic force becomes greater than the biasing force of the spring 322. As such, the DC signal to the solenoid coil 710 can be removed, and the armature 300 stays "latched" to the proximal pole piece 302 in a stable position.

With this configuration, the first polarity electric signal from the controller 428 can be applied to the solenoid coil 710 for a particular period of time to move the armature 300 and can then be removed, while the armature 300 remains latched to the proximal pole piece 302 due to the magnetic force of the magnet 308. As an example for illustration, the controller 428 applies a 16 volts (V) DC signal for a period of about 100 milliseconds (ms) to the solenoid coil 710 and the DC signal can then be removed, while the armature 300 remains latched or secured against the proximal pole piece 302. This way, power loss does not affect the commanded state of the pilot valve 700.

As such, the first commanded state achieved when a DC signal with the first polarity is provided to the solenoid coil 710 can be referred to as a "latched state." At the latched state, the armature 300 is secured against the proximal pole piece 302. As depicted in FIG. 11, the armature 300 includes or houses another seal element 344 within the distal end of the armature 300. Similar to the seal element 606, the seal element 344 can be made of a flexible, compressible material such that when the armature 300 presses against the proximal pole piece 302, the seal element 344 is compressed to effectively seal the channel 310 of the proximal pole piece 302.

On the other hand, the proximal end of the armature 300 disengages from the interior surface of the manifold 702 and the longitudinal channel 608 is exposed (i.e., the seal element 606 no longer seals the longitudinal channel 608). As a result, pressurized fluid provided from the source 414 of fluid to the inlet port 704 flows through the lateral channel in the cylindrical portion 707 of the manifold 702, then flows through the longitudinal channel 608 to the inner chamber 320, then through the window 326 to the outer chamber 328, then through the channel 330 and the channel 342 and through the outlet port 706 to the fluid consumer 708 that is fluidly coupled to the outlet port 706.

As such, in the first commanded state, fluid is allowed to flow from the source 414 to the fluid consumer 708. The pilot valve 700 operates in the first commanded state until a command DC signal with a second polarity (opposite the first polarity) is applied to the solenoid coil 710.

For example, a DC signal with the second polarity is provided to the pilot valve 700 when positive voltage of the DC signal is applied to the terminal 118 while the negative voltage is applied to the terminal 120. When the DC signal with the second polarity is provided through the windings of the solenoid coil 710, the magnetic field generated has an opposite polarity compared to when the DC signal with the first polarity is provided to the solenoid coil 710.

As a result, when the DC signal with the second polarity is provided through the windings of the solenoid coil 710, the armature 300 is repelled away from the pole pieces 302, 304. Thus, in the second commanded state, three forces are acting on the armature 300: (i) the biasing force of the spring 322 acting in the proximal direction, (ii) the electromagnetic force or solenoid force generated by energizing the solenoid coil 710 (with the second polarity DC power) also acting in the proximal direction and is additive to the biasing force of the spring 322, and (iii) the magnetic force of the magnet 308 acting in the distal direction.

The combined spring force of the spring 322 and the solenoid force overcome the magnetic force of the magnet 308, causing the armature 300 to be "unlatched" from the proximal pole piece 302 and move back to the axial position depicted in FIGS. 11 and 13-14. As the armature 300 moves away from the magnet 308, the magnetic force of the magnet 308 decreases and becomes smaller than the biasing force of the spring 322. As such, the DC signal to the solenoid coil 710 can be removed, and the armature 300 stays "unlatched" from the proximal pole piece 302 in a stable position.

With this configuration, the second polarity electric signal from the controller 428 is applied to the solenoid coil 710 for a particular period of time to move the armature 300 back to the unlatched position and is then removed. As an example for illustration, the controller 428 applies a 16 volts (V) DC signal for a period of about 100 milliseconds (ms) to the solenoid coil 710 and the signal is then removed, while the armature 300 remains unlatched from the proximal pole piece 302. This way, power loss does not affect the commanded state of the pilot valve 700.

The second commanded state achieved when a DC signal with the second polarity is provided to the solenoid coil 710 can be referred to as an "unlatched state" and is depicted in FIGS. 11 and 13-14. At the unlatched state, the proximal end of the armature 300 is secured against the interior surface of the manifold 702.

As depicted in FIG. 11, when the armature 300 presses against the interior surface of the manifold 702, the seal element 606 is compressed to effectively seal the longitudinal channel 608 of the manifold 702, thereby blocking fluid flow from the source 414. On the other hand, the distal end of the armature 300 disengages from the proximal pole piece 302 and the channel 310 is exposed (i.e., the seal element 344 no longer seals the channel 310).

As depicted in FIG. 11, the armature 300 includes one or more ridges, such as ridge 346 on an exterior surface of the armature 300. Alternatively, the armature 300 can include longitudinal slots or channels, rather than ridges. As such, fluid from the fluid consumer 708 (e.g., pressurized fluid from the fluid consumer 708 or trapped pressure in the fluid line connecting the outlet port 706 to the fluid consumer 708) is allowed to flow from the fluid consumer to the vent port 116.

Particularly, fluid flows from the outlet port 706 through the channel 342 and the channel 330 to the outer chamber 328, then through the window 326 to the inner chamber 320, then through the ridge 346 (between the exterior surface of the armature 300 and the interior surface of the solenoid coil 710) to the airgap 306, then through the channel 310, the hole 312, and the channel 314 to the gap 316, and then through the porous plug 318 to an external environment of the pilot valve 700. Thus, in the second commanded or unlatched state, the outlet port 706 is vented through the vent port 116 to the external environment of the pilot valve 700.

The pilot valve 700 can therefore be referred to as "bistable" as the armature 300 remains stable in the first commanded state or the second commanded state upon removing the electric signal. Further, the pilot valve 700 as described above is a two-position, three-way valve. Particularly, in a first position of the armature 300 (e.g., the latched state), the inlet port 704 is fluidly coupled to the outlet port 706 while the vent port 116 is blocked, and in a second position of the armature 300 (e.g., the unlatched state shown in FIG. 11), the outlet port 706 is fluidly coupled to the vent port 116 while the inlet port 704 is blocked.

The pilot supply valves 406, 434, 438 and the pilot exhaust valves 408, 436, 440 are variants of the pilot valve 700. Particularly, the pilot supply valves 406, 434, 438 and the pilot exhaust valves 408, 436, 440 are two-way valves rather than three-way valves as the pilot valve 700.

Further, pilot supply valves 406, 434, 438 can have different configurations relative to each other based on their location in the valve assembly. For example, in the valve assembly 402 shown in FIG. 6, the pilot supply valve 406 can be referred to as an end pilot supply valve as there are no additional valves downstream from the pilot supply valve 406. In the valve assembly 430 shown in FIG. 7, the pilot supply valve 406 can be referred to as an intermediate pilot supply valve as there is an additional pilot supply valve (i.e., the pilot supply valve 434) downstream from the pilot supply valve 406, and the pilot supply valve 434 is the end pilot supply valve. In the valve assembly 432 shown in FIG. 8, the pilot supply valves 406, 434 can be referred to as an intermediate pilot supply valve as there is an additional pilot supply valve (i.e., the pilot supply valve 438) downstream from the pilot supply valves 406, 434, and the pilot supply valve 438 is the end pilot supply valve.

Figure 15:
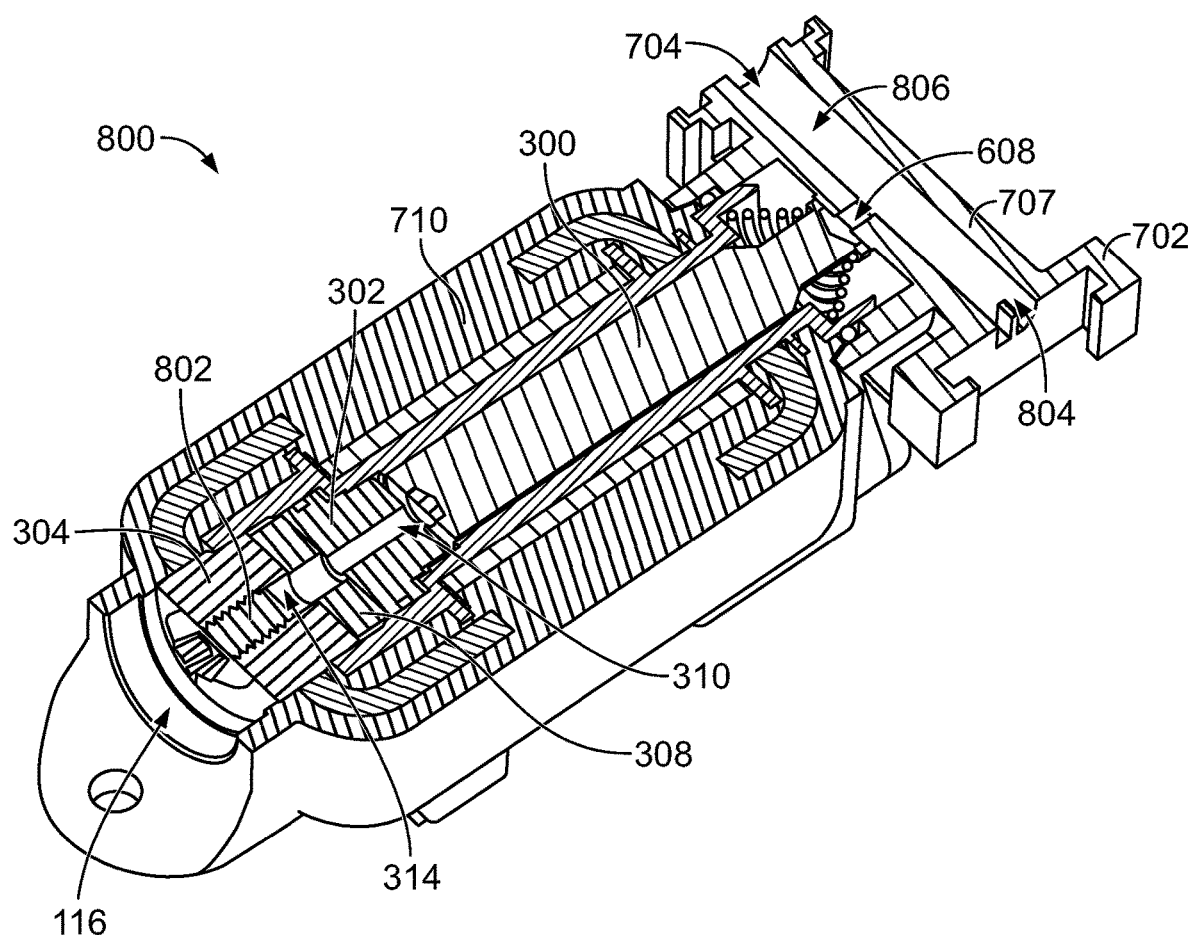
FIG. 15 illustrates a perspective cross-sectional view of an intermediate pilot supply valve, in accordance with an example implementation.

FIG. 15 illustrates a perspective cross-sectional view of an intermediate pilot supply valve 800, in accordance with an example implementation. The intermediate pilot supply valve 800 represents, for example, the pilot supply valve 406 in the valve assembly 430 (FIG. 7) and represents the pilot supply valves 406, 434 in the valve assembly 432 (FIG. 8).

As shown in FIG. 15, the intermediate pilot supply valve 800 is similar to the pilot valve 700 described above. However, rather than having the porous plug 318 that can allow fluid flow to the vent port 116, the intermediate pilot supply valve 800 does not have a porous plug. Rather, the intermediate pilot supply valve 800 has a screw plug 802 that is inserted in the channel 314 of the distal pole piece 304.

The screw plug 802 blocks the vent port 116. As such, when the armature 300 of the intermediate pilot supply valve 800 is in the unlatched state, the outlet port is not vented to the vent port 116. The intermediate pilot supply valve 800 is thus a two-way valve that allows fluid flow from the inlet port 704 to the outlet port 706 (not shown in FIG. 15) when the armature 300 is in the latched stated upon energizing the solenoid coil 710 with the first polarity electric signal. When the solenoid coil 710 is energized with the second polarity electric signal and the armature 300 moves to the unlatched state, the flow path from the inlet port 704 to the outlet port 706 is closed, and the flow path from the outlet port 706 to the vent port 116 is also blocked by the screw plug 802. This way, the intermediate pilot supply valve 800 operates as a two-way valve rather than a three-way valve.

Notably, the intermediate pilot supply valve 800 has an opening 804 that allows fluid received at the inlet port 704 to flow through a channel 806 in the cylindrical portion 707 of the manifold 702 to valves downstream from the intermediate pilot supply valve 800. An end pilot supply valve, however, is configured to block fluid flow as there are no valves downstream therefrom.

Figure 16:
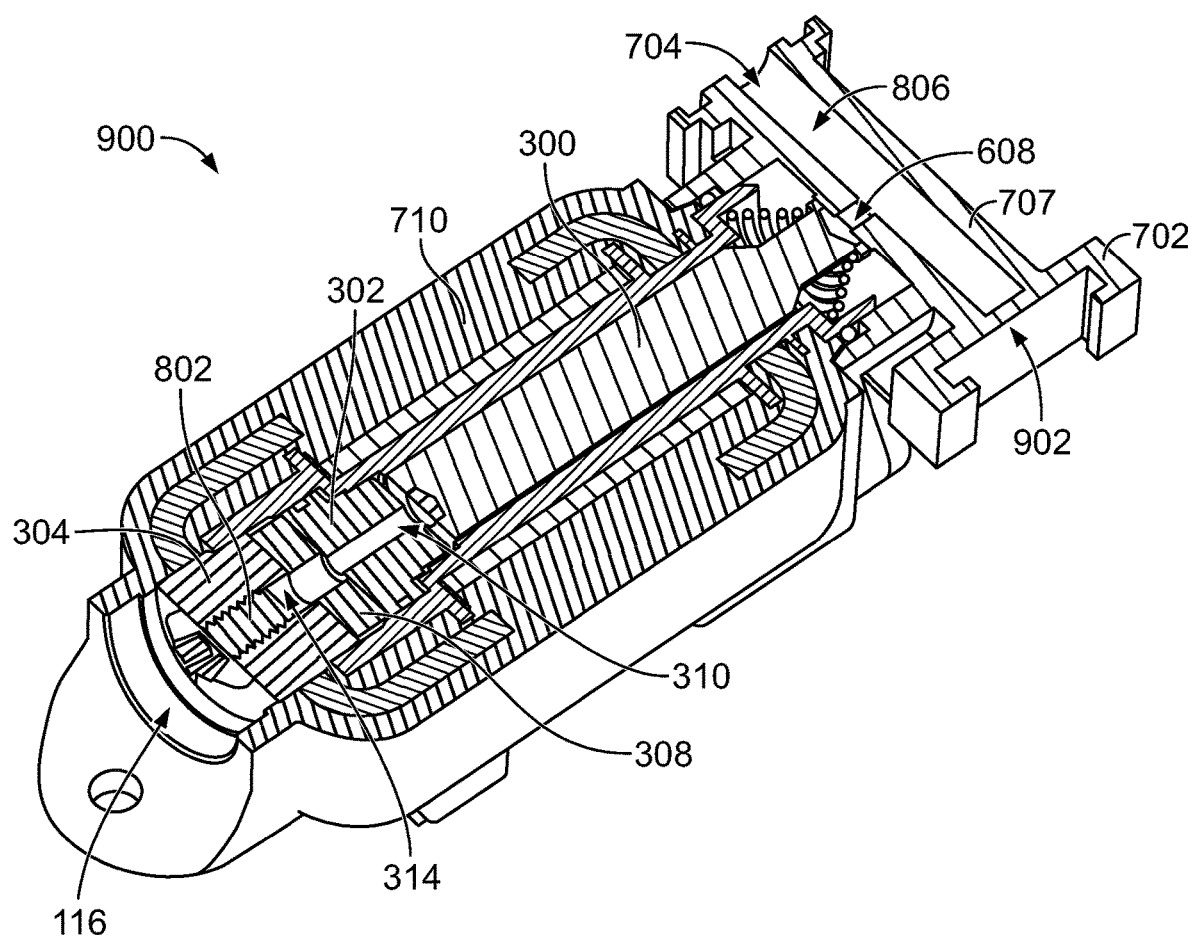
FIG. 16 illustrates a perspective cross-sectional view of an end pilot supply valve, in accordance with an example implementation.

FIG. 16 illustrates a perspective cross-sectional view of an end pilot supply valve 900, in accordance with an example implementation. The end pilot supply valve 900 represents, for example, the pilot supply valve 406 in the valve assembly 402 (FIG. 6), represents the pilot supply valves 434 in the valve assembly 430 (FIG. 7), and represents the pilot supply valves 438 in the valve assembly 432 (FIG. 8).

As shown in FIG. 16, the end pilot supply valve 900 is similar to the intermediate pilot supply valve 800, except that the end pilot supply valve 900 does not have the opening 804. Rather, the manifold 702 in the case of the end pilot supply valve 900 has a blocked end 902 that blocks the channel 806 as there are no valves downstream from the end pilot supply valve 900.

Figure 17:
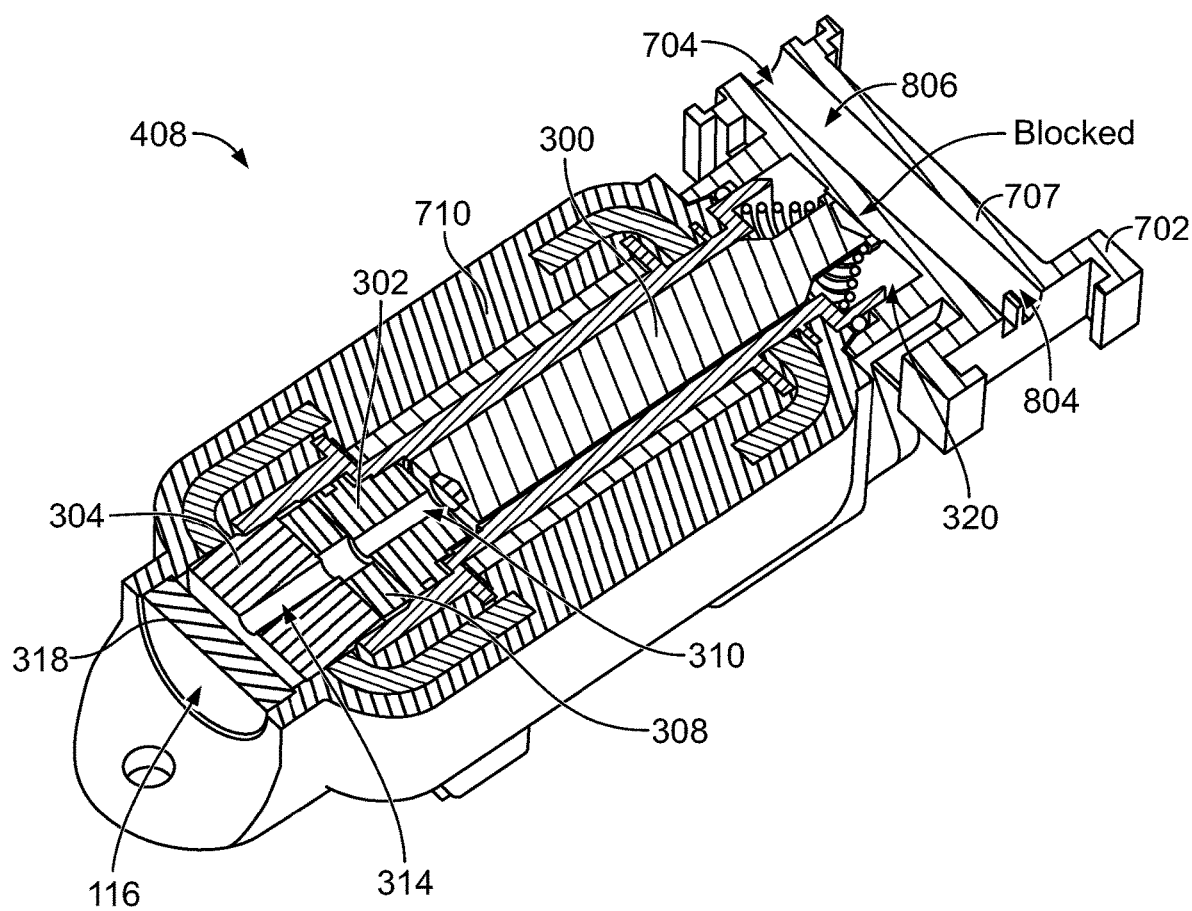
FIG. 17 illustrates a perspective cross-sectional view of a pilot exhaust valve, in accordance with an example implementation.

FIG. 17 illustrates a perspective cross-sectional view of the pilot exhaust valve 408, in accordance with an example implementation. The pilot exhaust valves 436, 440 are configured similar to the pilot exhaust valve 408.

As shown in FIG. 17, the pilot exhaust valve 408 is similar to the pilot valve 700 described above. However, the pilot exhaust valve 408 does not have the longitudinal channel 608 formed in the manifold 702. This way, when the solenoid coil 710 of the pilot exhaust valve 408 is energized with the first polarity and the armature 300 moves to the latched state, fluid from the source 414 received at the inlet port 704 does not enter the inner chamber 320 and does not flow to the outlet port 706. Rather, the fluid from the source 414 flows through the channel 806 and the opening 804 to the pilot supply valve 406 positioned downstream from the pilot exhaust valve 408.

In contrast to the pilot supply valves 406, 434, 438, the pilot exhaust valve 408 has the porous plug 318 and the channel 314 is not blocked. As such, when the armature 300 of the pilot exhaust valve 408 is in the unlatched state, the outlet port 706 is vented to the vent port 116. The pilot exhaust valve 408 is thus a two-way valve that allows fluid flow from the outlet port 706 to the vent port 116 when the armature 300 is in the unlatched stated upon energizing the solenoid coil 710 with the second first polarity electric signal. When the solenoid coil 710 is energized with the first polarity electric signal and the armature 300 moves to the latched state, the flow path from the outlet port 706 to the vent port 116 is closed. This way, the pilot exhaust valve 408 operates as a two-way valve rather than a three-way valve.

Figure 18:
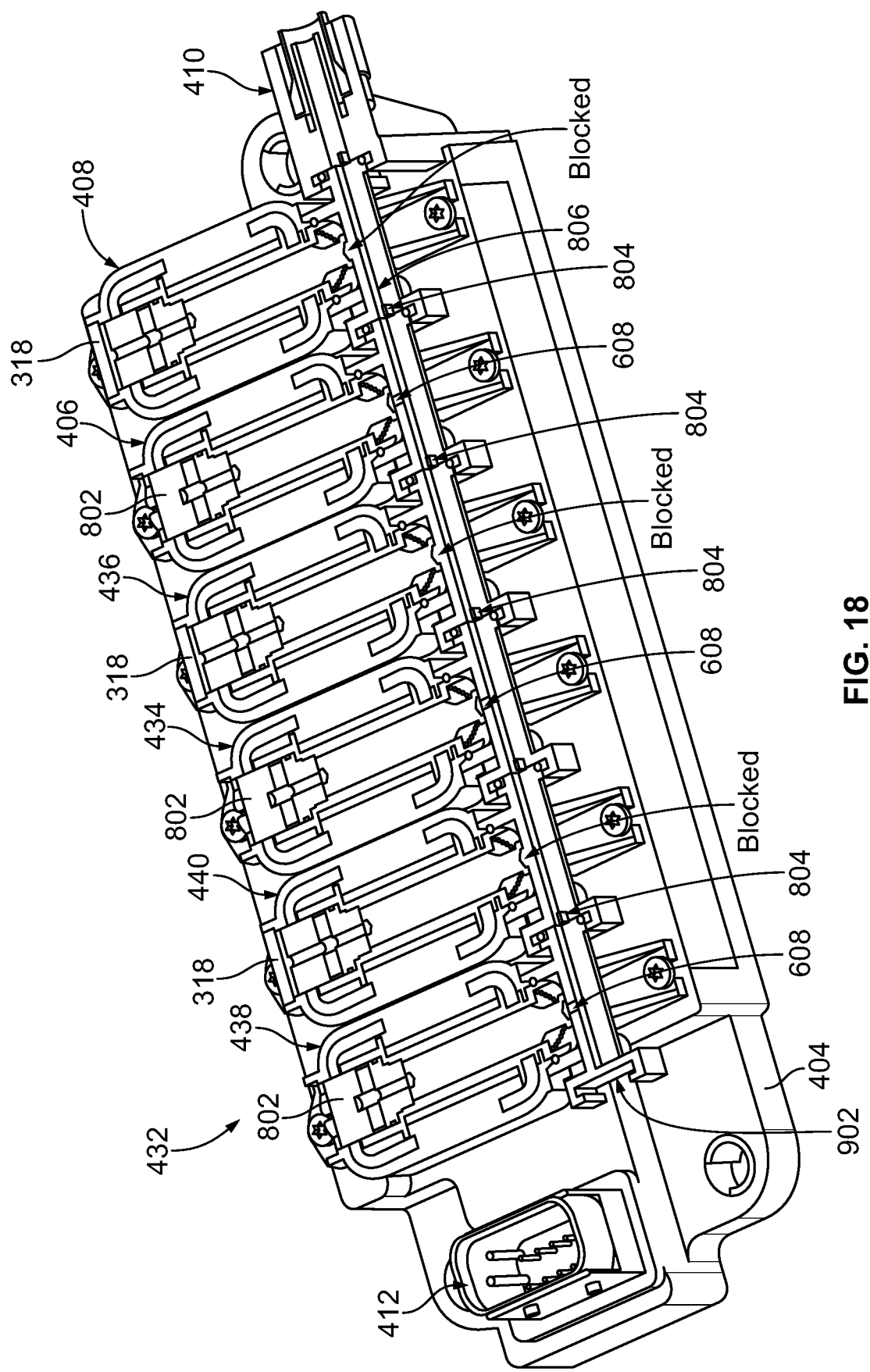
FIG. 18 illustrates a perspective cross-sectional view of the valve assembly shown in FIG. 8, in accordance with an example implementation.

FIG. 18 illustrates a perspective cross-sectional view of the valve assembly 432, in accordance with an example implementation. As shown, the pilot supply valves 406, 434, 438 are interleaved with the pilot exhaust valves 408, 436, 440. In other words, the pilot supply valve 406 is interposed between the pilot exhaust valves 408, 436; the pilot exhaust valve 436 is interposed between the pilot supply valves 406, 434; the pilot supply valve 434 is interposed between the pilot exhaust valves 436, 440; and the pilot exhaust valve 440 is interposed between the pilot supply valves 434, 438.

The pilot supply valves 406, 434 are configured as the intermediate pilot supply valve 800, and thus each has the opening 804. Thus, respective channels 806 of respective manifolds 702 of the six pilot valves shown in FIG. 18 form a continuous channel to communicate fluid received from the source 414 of fluid through the inlet fitting 410 to the pilot supply valves 406, 434, 438, which each have the longitudinal channel 608. The pilot supply valve 438 is configured as the end pilot supply valve 900, and thus has the blocked end 902 at the end of the continuous channel. Further, each of the pilot supply valves 406, 434, 438 has the screw plug 802 to block fluid flow to the vent port 116.

The pilot exhaust valves 408, 436, 440 on the other hand each has the porous plug 318, but their respective inner chambers (i.e., the inner chamber 320) do not receive inlet fluid flowing through the channels 806.

Operations of the system 400 to inflate and deflate the axle-lowering bags 202, 203 and the axle-lifting bags 204, 205 are described next with respect to one retractable axle and one set of pilot valves (the pilot supply valve 406 and the pilot exhaust valve 408). However, it should be understood that operating other retractable axles and other pilot valves if the vehicle 100 has more than one retractable axle is similar.

Figure 19:
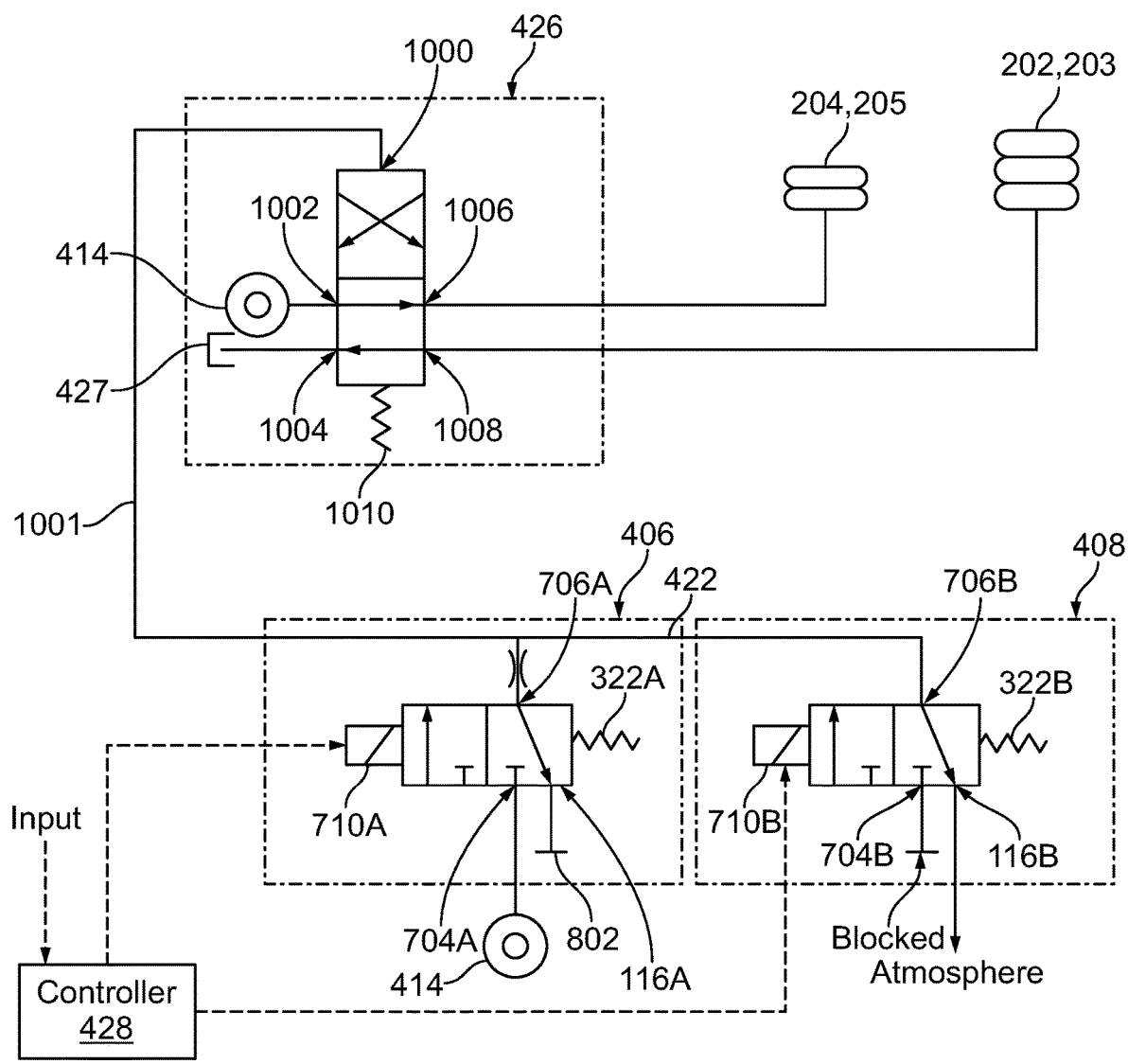
FIG. 19 illustrates a schematic diagram of the system of FIG. 6 in an axle-lifting state, in accordance with an example implementation.

FIG. 19 illustrates a schematic diagram of the system 400 in an axle-lifting state, in accordance with an example implementation. Components of the system 400 are depicted symbolically in FIG. 19. Components of the pilot supply valve 406 are designated with the same reference numbers used for the pilot valve 700 with an "A" suffix, and components of the pilot exhaust valve 408 are designated with the same reference numbers used for the pilot valve 700 with a "B" suffix.

As depicted, the main valve 426 can be configured as a pilot-operated directional control valve. Particularly, as symbolically indicated in FIG. 19, the main valve 426 can be a four-way, two-position valve. The main valve 426 can have a pilot port 1000 fluidly coupled via fluid line 1001 (e.g., a hose) to the outlet ports 706A, 706B of the pilot supply valve 406 and the pilot exhaust valve 408, respectively. As mentioned above with respect to FIG. 6, the outlet ports 706A, 706B of the pilot supply valve 406 and the pilot exhaust valve 408 are fluidly coupled to each other via the hose 422.

The pilot supply valve 406 and the pilot exhaust valve 408 are configured to control the pilot fluid signal to the pilot port 1000 of the main valve 426, which then controls fluid flow to and from the axle-lowering bag 202, 203 and the axle-lifting bags 204, 205. Particularly, the main valve 426 can have (i) a supply port 1002 that is fluidly coupled to the source 414 of fluid, (ii) a reservoir port 1004 that is fluidly coupled to the reservoir 427, (iii) a first workport 1006 that is fluidly coupled to the axle-lifting bags 204, 205, and (iv) a second workport 1008 that is fluidly coupled to the axle-lowering bags 202, 203. The source 414 of fluid is drawn in two locations in FIG. 19 to reduce visual clutter but it should be understood that the system 400 can include one source of fluid providing pressurized fluid (e.g., compressed air) to both the main valve 426 and the pilot valves via respective fluid passages.

The main valve 426 can have a movable element (e.g., a spool, piston, or poppet) therein that is shiftable within a valve body of the main valve 426 to direct fluid flow to and from the first workport 1006 and the second workport 1008 based on a state of the main valve 426. The movable element of the main valve 426 can be biased to the state shown in FIG. 19 via a biasing element such as a spring 1010. If, however, a pilot fluid signal having a sufficient pressure level is provided to the pilot port 1000, the movable element can shift against the biasing force of the spring 1010 to operate the main valve 426 in a different state (shown in FIG. 20).

The controller 428 can receive an input indicating a request to retract the retractable axle 210. For instance, an operator of the vehicle 100 may press a button to provide the input to the controller 428 or the controller 428 receives input information indicative of a weight of the cargo of the vehicle 100, and accordingly determine that the retractable axle 210 is not needed.

In order to lift the retractable axle 210, the controller 428 operates the pilot supply valve 406 and the pilot exhaust valve 408 in a manner that causes the axle-lifting bags 204, 205 to be inflated. Particularly, to inflate or fill the axle-lifting bags 204, 205 to lift the retractable axle 210, the controller 428 causes both the pilot supply valve 406 and the pilot exhaust valve 408 to operate in the unlatched state (e.g., the controller 428 can provide a signal with the second polarity to the solenoid coils 710A, 710B to unlatch the armature 300 from the magnet 308). In the unlatched state, the outlet port 706A of the pilot supply valve 406 is fluidly coupled to the vent port 116A, which is blocked by the screw plug 802.

Also, the outlet port 706B of the pilot exhaust valve 408 is fluidly coupled to the vent port 116B, thereby draining or venting the pilot port 1000 of the main valve 426 to the atmospheric environment of the vehicle 100. As such, the pilot port 1000 has low pressure (e.g., atmospheric pressure) fluid and the spring 1010 biases the movable element of the main valve 426, causing the main valve 426 to operate in the unactuated state depicted in FIG. 19.

In the state of the main valve 426 depicted in FIG. 19 (the spring-biased state or unactuated state), the supply port 1002 is fluidly coupled to the first workport 1006, which is fluidly coupled to the axle-lifting bags 204, 205. As such, fluid from the source 414 flows through the main valve 426 to the axle-lifting bags 204, 205, causing them to inflate. At the same time, the reservoir port 1004 is fluidly coupled to the second workport 1008, which is fluidly coupled to the axle-lowering bags 202, 203. As such, fluid from the axle-lowering bags 202, 203 is drained or exhausted through the main valve 426 to the reservoir 427, causing them to deflate. As a result of inflating the axle-lifting bags 204, 205 and deflating the axle-lowering bags 202, 203, the retractable axle 210 is lifted off the road surface 106.

Figure 20:
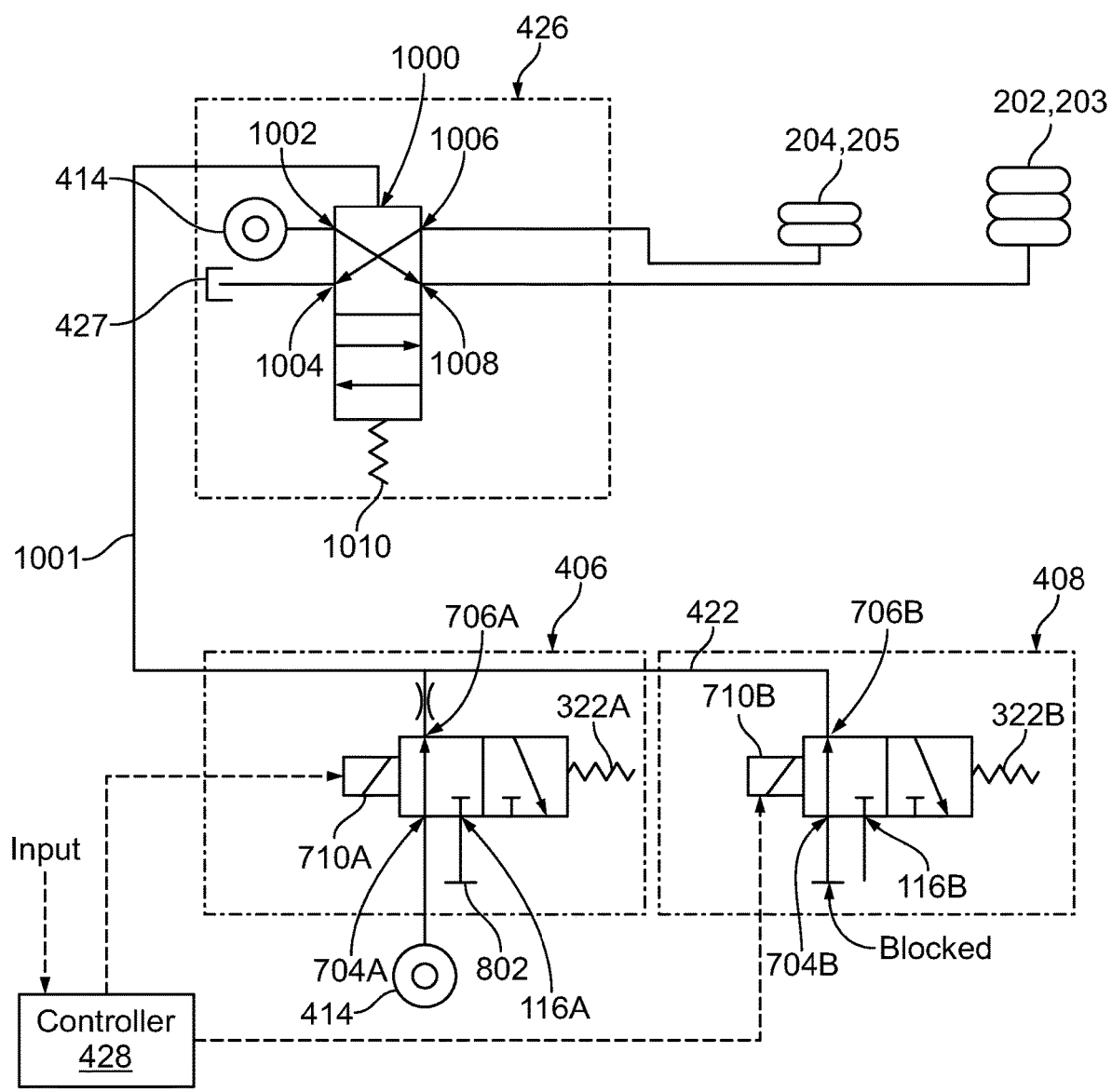
FIG. 20 illustrates a schematic diagram of the system of FIG. 6 in an axle-lowering state, in accordance with an example implementation.

FIG. 20 illustrates a schematic diagram of the system 400 in an axle-lowering state, in accordance with an example implementation. The controller 428 can receive an input indicating a request to lower the retractable axle 210. For instance, an operator of the vehicle 100 may press a button to provide an input to the controller 428 indicating a request to lower the retractable axle 210, or the controller 428 receives input information indicative of a weight of the cargo of the vehicle 100, and accordingly determines that the retractable axle 210 is to be deployed to distribute the weight among a larger number of axles.

In order to lower the retractable axle 210, the controller 428 operates the pilot supply valve 406 and the pilot exhaust valve 408 in a manner that causes the axle-lowering bags 202, 203 to be inflated. Particularly, to inflate or fill the axle-lowering bags 202, 203 to lower the retractable axle 210, the controller 428 causes both the pilot supply valve 406 and the pilot exhaust valve 408 to operate in the latched state (e.g., the controller 428 can provide a signal with the first polarity to the solenoid coils 710A, 710B to move the armature 300 to the latched state). In the latched state, the inlet port 704A of the pilot supply valve 406 is fluidly coupled to the outlet port 706A, and therefore fluid from the source 414 flows to the outlet port 706A.

The inlet port 704B of the pilot exhaust valve 408 is blocked as described above with respect to FIG. 17 (the longitudinal channel 608 does not exist and thus no fluid from the channel 806 enters the inner chamber 320), and also the vent port 116B is blocked by the armature 300, which has moved to the latched state. As such, a pilot fluid signal is provided from the outlet port 706A of the pilot supply valve 406 to the pilot port 1000 of the main valve 426. Pressure level of the pilot fluid signal can increase until it overcomes the biasing force of the spring 1010, thereby shifting the movable element of the main valve 426 and causing the main valve 426 to operate in the actuated state depicted in FIG. 20.

In the state of the main valve 426 depicted in FIG. 20 (the actuated state), the supply port 1002 is fluidly coupled to the second workport 1008, which is fluidly coupled to the axle-lowering bags 202, 203. As such, fluid from the source 414 flows through the main valve 426 to the axle-lowering bags 202, 203, causing them to inflate. At the same time, the reservoir port 1004 is fluidly coupled to the first workport 1006, which is fluidly coupled to the axle-lifting bags 204, 205. As such, fluid from the axle-lifting bags 204, 205 is drained or exhausted through the main valve 426 to the reservoir 427, causing them to deflate. As a result of inflating the axle-lowering bags 202, 203 and deflating the axle-lifting bags 204, 205, the retractable axle 210 is lowered such that the wheels contact the road surface 106 and the retractable axle 210 supports the weight of the vehicle 100 and its cargo with other axles of the vehicle 100.

In an example, once the main valve 426 is actuated to the state shown in FIG. 20, the pilot supply valve 406 can be switched back to the unlatched state (e.g., by the controller 428 sending a signal having the second polarity to the solenoid coil 710A). As a result, the pilot supply valve 406 operates in the unlatched state (shown in FIG. 19) where the inlet port 704A is blocked). However, the controller 428 maintains the pilot exhaust valve 408 operating in the latched state shown in FIG. 20 such that the pilot port 1000 is not drained to the reservoir. Rather, the outlet port 706B is blocked. This way, pressure level in the fluid line 1001 coupling the outlet ports 706A, 706B is maintained and the main valve 426 remains in the actuated state. When it is desired to lift the retractable axle 210, then the controller 428 sends a signal with the second polarity to the solenoid coil 710B to operate the pilot exhaust valve 408 in the unlatched state as shown in FIG. 19 to drain the pilot port 1000 and operate the main valve 426 in the unactuated state.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiment (EEEs) listed below.

EEE 1 is a valve assembly comprising: (i) a mounting plate having an inlet port configured to be fluidly coupled to a source of fluid; (ii) a pilot supply valve mounted to the mounting plate, wherein the pilot supply valve comprises (a) an inlet port fluidly coupled to the inlet port of the mounting plate, and (b) a first outlet port configured to be fluidly coupled to a pilot port of a main valve; and (iii) a pilot exhaust valve mounted to the mounting plate, wherein the pilot exhaust valve comprises (a) a vent port, (b) a second outlet port that is fluidly coupled to the first outlet port of the pilot supply valve. The valve assembly is configured to operate in: (i) a first state at which the pilot supply valve allows a pilot fluid signal to flow from the inlet port to the first outlet port to actuate the main valve, while the pilot exhaust valve blocks fluid flow from the second outlet port to the vent port to allow the pilot fluid signal to flow to the pilot port of the main valve to actuate the main valve, and (ii) a second state at which the pilot supply valve blocks fluid flow from the inlet port to the first outlet port, while the pilot exhaust valve allows fluid flow from the second outlet port to the vent port to drain the pilot port of the main valve, thereby unactuating the main valve.

EEE 2 is the valve assembly of EEE 1, wherein the pilot supply valve further comprises: (i) a solenoid coil, (ii) an armature slidably accommodated within the solenoid coil, (iii) a magnet fixedly disposed within the solenoid coil, wherein the magnet applies a magnetic force on the armature in a distal direction, and (iv) a spring applying a biasing force on the armature in a proximal direction, wherein to operate the valve assembly in the first state, the solenoid coil is energized with a first signal having a first polarity, thereby causing a solenoid force to be applied to the armature in the distal direction, wherein a combination of the magnetic force and the solenoid force overcome the biasing force of the spring, causing the armature to move axially in the distal direction to a first position, thereby allowing the pilot fluid signal to flow from the inlet port to the first outlet port to actuate the main valve, and wherein when the armature is in the first position, the magnetic force of the magnet is greater than the biasing force of the spring, and the armature remains in the first position upon removal of the first signal.

EEE 3 is the valve assembly of EEE 2, wherein to operate the valve assembly in the second state, the solenoid coil is energized with a second signal having a second polarity opposite the first polarity, thereby causing a solenoid force to be applied to the armature in the proximal direction, wherein a combination of the biasing force of the spring and the solenoid force overcome the magnetic force, causing the armature to move axially in the proximal direction to a second position, thereby blocking fluid flow from the inlet port to the first outlet port, and wherein when the armature is in the second position, the magnetic force of the magnet is smaller than the biasing force, and the armature remains in the second position upon removal of the second signal.

EEE 4 is the valve assembly of any of EEEs 1-3, wherein the pilot exhaust valve further comprises: (i) a solenoid coil, (ii) an armature slidably accommodated within the solenoid coil, (iii) a magnet fixedly disposed within the solenoid coil, wherein the magnet applies a magnetic force on the armature in a distal direction, and (iv) a spring applying a biasing force on the armature in a proximal direction, wherein to operate the valve assembly in the first state, the solenoid coil is energized with a first signal having a first polarity, thereby causing a solenoid force to be applied to the armature in the distal direction, wherein a combination of the magnetic force and the solenoid force overcome the biasing force of the spring, causing the armature to move axially in the distal direction to a first position, thereby blocking fluid flow from the second outlet port to the vent port to allow the pilot fluid signal to flow to the pilot port of the main valve, and wherein when the armature is in the first position, the magnetic force of the magnet is greater than the biasing force of the spring, and the armature remains in the first position upon removal of the first signal.

EEE 5 is the valve assembly of EEE 4, wherein to operate the valve assembly in the second state, the solenoid coil is energized with a second signal having a second polarity opposite the first polarity, thereby causing a solenoid force to be applied to the armature in the proximal direction, wherein a combination of the biasing force of the spring and the solenoid force overcome the magnetic force, causing the armature to move axially in the proximal direction to a second position, thereby allowing fluid flow from the second outlet port to the vent port to drain the pilot port of the main valve and unactuate the main valve, and wherein when the armature is in the second position, the magnetic force of the magnet is smaller than the biasing force, and the armature remains in the second position upon removal of the second signal.

EEE 6 is a valve assembly comprising (i) a mounting plate having an inlet port configured to be fluidly coupled to a source of fluid; (ii) a pilot supply valve mounted to the mounting plate, wherein the pilot supply valve comprises (a) an inlet port fluidly coupled to the inlet port of the mounting plate, (b) a first outlet port configured to be fluidly coupled to a pilot port of a main valve, (c) a first solenoid coil, (d) a first armature slidably accommodated within the first solenoid coil, (e) a first magnet fixedly disposed within the first solenoid coil, wherein the first magnet applies a magnetic force on the first armature in a distal direction, and (f) a first spring applying a biasing force on the first armature in a proximal direction; and (iii) a pilot exhaust valve mounted to the mounting plate, wherein the pilot exhaust valve comprises (a) a vent port, (b) a second outlet port that is fluidly coupled to the first outlet port of the pilot supply valve, (c) a second solenoid coil, (d) a second armature slidably accommodated within the second solenoid coil, (e) a second magnet fixedly disposed within the second solenoid coil, wherein the second magnet applies a magnetic force on the second armature in the distal direction, and (f) a second spring applying a biasing force on the second armature in the proximal direction.

EEE 7 is the valve assembly of EEE 6, wherein the valve assembly is configured to operate in a first state at which the first solenoid coil is energized with a first signal having a first polarity, thereby causing a solenoid force to be applied to the first armature in the distal direction, wherein a combination of the magnetic force and the solenoid force overcome the biasing force of the first spring, causing the first armature to move axially in the distal direction to a first position, thereby allowing a pilot fluid signal to flow from the inlet port to the first outlet port to actuate the main valve, and wherein when the first armature is in the first position, the magnetic force of the first magnet is greater than the biasing force of the first spring, and the first armature remains in the first position upon removal of the first signal.

EEE 8 is the valve assembly of EEE 7, wherein to operate the valve assembly in the first state, the second solenoid coil is energized with a respective first signal having the first polarity, thereby causing a solenoid force to be applied to the second armature in the distal direction, wherein a combination of the magnetic force and the solenoid force overcome the biasing force of the second spring, causing the second armature to move axially in the distal direction to a respective first position, thereby blocking fluid flow from the second outlet port to the vent port to allow the pilot fluid signal to flow to the pilot port of the main valve.

EEE 9 is the valve assembly of any of EEEs 7-8, wherein the valve assembly is configured to operate in a second state at which the first solenoid coil is energized with a second signal having a second polarity, thereby causing a solenoid force to be applied to the first armature in the proximal direction, wherein a combination of the biasing force of the first spring and the solenoid force overcome the magnetic force, causing the first armature to move axially in the proximal direction to a second position, thereby blocking fluid flow from the inlet port to the first outlet port, and wherein when the first armature is in the second position, the magnetic force of the first magnet is smaller than the biasing force of the first spring, and the first armature remains in the second position upon removal of the second signal.

EEE 10 is the valve assembly of EEE 9, wherein to operate the valve assembly in the second state, the second solenoid coil is energized with a respective second signal having the second polarity, thereby causing a solenoid force to be applied to the second armature in the proximal direction, wherein a combination of the biasing force of the second spring and the solenoid force overcome the magnetic force, causing the second armature to move axially in the proximal direction to a respective second position, thereby allowing fluid flow from the second outlet port to the vent port to drain the pilot port of the main valve and unactuate the main valve, and wherein when the second armature is in the respective second position, the magnetic force of the second magnet is smaller than the biasing force of the second spring, and the second armature remains in the respective second position upon removal of the respective second signal.

EEE 11 is a system comprising: a main valve having: (i) a supply port configured to be fluidly coupled to a source of fluid, (ii) a reservoir port configured to be fluidly coupled to a reservoir of fluid, (iii) a first workport configured to be fluidly coupled to axle-lifting bags configured to lift a retractable axle of a vehicle when inflated, (iv) a second workport configured to be fluidly coupled to axle-lowering bags configured to lower the retractable axle of the vehicle when inflated, and (v) a pilot port, wherein the main valve is configured to operate in: (i) an unactuated state, when the pilot port is drained, at which the supply port is fluidly coupled to the first workport and the reservoir port is fluidly coupled to the second workport, thereby allowing the axle-lifting bags to be inflated, and (ii) an actuated state, when a pilot fluid signal is provided to the pilot port, at which the supply port is fluidly coupled to the second workport and the reservoir port is fluidly coupled to the first workport, thereby allowing the axle-lowering bags to be inflated. The system also includes the valve assembly of any of EEEs 1-5 or EEEs 6-10. The system further includes a controller configured to perform operations comprising: (i) operating the valve assembly in a first state at which the pilot supply valve allows the pilot fluid signal to flow from the inlet port to the first outlet port, while the pilot exhaust valve blocks fluid flow from the second outlet port to the vent port to allow the pilot fluid signal to flow to the pilot port of the main valve to operate the main valve in the actuated state, and (ii) operating the valve assembly in a second state at which the pilot supply valve blocks fluid flow from the inlet port to the first outlet port, while the pilot exhaust valve allows fluid flow from the second outlet port to the vent port to drain the pilot port of the main valve to operate the main valve in the unactuated state.

EEE 12 is the system of EEE 11, wherein the pilot supply valve further comprises: (i) a solenoid coil, (ii) an armature slidably accommodated within the solenoid coil, (iii) a magnet fixedly disposed within the solenoid coil, wherein the magnet applies a magnetic force on the armature in a distal direction, and (iv) a spring applying a biasing force on the armature in a proximal direction, wherein operating, by the controller, the valve assembly in the first state comprises: sending a first signal having a first polarity to the solenoid coil, thereby causing a solenoid force to be applied to the armature in the distal direction, wherein a combination of the magnetic force and the solenoid force overcome the biasing force of the spring, causing the armature to move axially in the distal direction to a first position, thereby allowing the pilot fluid signal to flow from the inlet port to the first outlet port to actuate the main valve, and wherein when the armature is in the first position, the magnetic force of the magnet is greater than the biasing force of the spring, and the armature remains in the first position upon removal of the first signal.

EEE 13 is the system of EEE 12, wherein operating, by the controller, the valve assembly in the second state comprises: sending a second signal having a second polarity opposite the first polarity to the solenoid coil, thereby causing a solenoid force to be applied to the armature in the proximal direction, wherein a combination of the biasing force of the spring and the solenoid force overcome the magnetic force, causing the armature to move axially in the proximal direction to a second position, thereby blocking fluid flow from the inlet port to the first outlet port, and wherein when the armature is in the second position, the magnetic force of the magnet is smaller than the biasing force, and the armature remains in the second position upon removal of the second signal.

EEE 14 is the system of any of EEEs 11-13, wherein the pilot exhaust valve further comprises: (i) a solenoid coil, (ii) an armature slidably accommodated within the solenoid coil, (iii) a magnet fixedly disposed within the solenoid coil, wherein the magnet applies a magnetic force on the armature in a distal direction, and (iv) a spring applying a biasing force on the armature in a proximal direction, wherein operating, by the controller, the valve assembly in the first state comprises: sending a first signal having a first polarity to the solenoid coil, thereby causing a solenoid force to be applied to the armature in the distal direction, wherein a combination of the magnetic force and the solenoid force overcome the biasing force of the spring, causing the armature to move axially in the distal direction to a first position, thereby blocking fluid flow from the second outlet port to the vent port to allow the pilot fluid signal to flow to the pilot port of the main valve, and wherein when the armature is in the first position, the magnetic force of the magnet is greater than the biasing force of the spring, and the armature remains in the first position upon removal of the first signal.

EEE 15 is the system of EEE 14, wherein operating, by the controller, the valve assembly in the second state comprises: sending a second signal having a second polarity opposite the first polarity to the solenoid coil, thereby causing a solenoid force to be applied to the armature in the proximal direction, wherein a combination of the biasing force of the spring and the solenoid force overcome the magnetic force, causing the armature to move axially in the proximal direction to a second position, thereby allowing fluid flow from the second outlet port to the vent port to drain the pilot port of the main valve and unactuate the main valve, and wherein when the armature is in the second position, the magnetic force of the magnet is smaller than the biasing force, and the armature remains in the second position upon removal of the second signal.

EEE 16 is the vehicle comprising a retractable axle; axle-lifting bags configured to lift the retractable axle when inflated; axle-lowering bags configured to lower the retractable axle of the vehicle when inflated; a source of fluid; and a reservoir of fluid. The vehicle also includes the main valve of any of EEEs 11-15. The vehicle also includes the valve assembly of any of EEEs 1-5 or EEEs 6-10. The vehicle further includes the controller of any of EEEs 11-15.

EEE 17 is the vehicle of EEE 16, wherein the retractable axle is a first retractable axle, the pilot supply valve is a first pilot supply valve, the pilot exhaust valve is a first pilot exhaust valve, the main valve is a first main valve, the vehicle further comprising: a second retractable axle; and a second main valve, wherein the valve assembly further comprises: a second pilot supply valve mounted to the mounting plate downstream from the first pilot supply valve, and a second pilot exhaust valve mounted to the mounting plate, wherein the second pilot supply valve and the second pilot exhaust valve control flow of a respective pilot fluid signal to the second main valve based on signals from the controller to control lowering and lifting the second retractable axle.

EEE 18 is the vehicle of EEE 17, wherein the first pilot supply valve allows fluid from the source of fluid to flow therethrough to a respective inlet port of the second pilot supply valve, and wherein the second pilot supply valve precludes fluid from flowing downstream from the second pilot supply valve.

EEE 19 is the vehicle of EEE 18, wherein: the first pilot supply valve comprises a first manifold comprising the inlet port and comprising a first channel that is fluidly coupled to the inlet port of the mounting plate such that that the first channel allows fluid flow therethrough downstream from the first pilot supply valve, and the second pilot supply valve comprises a second manifold comprising the respective inlet port and comprising a second channel that is fluidly coupled to the first channel of the first pilot supply valve, wherein the second channel is blocked to preclude fluid flow downstream therefrom.

EEE 20 is the vehicle of any of EEEs 16-19, wherein the pilot exhaust valve comprises a porous plug disposed at the vent port, wherein the porous plug allows flow of pressurized fluid therethrough in a direction from within the pilot exhaust valve to an external environment of the pilot exhaust valve when the controller operates the valve assembly in the second state.

What is claimed is:

1. A valve assembly comprising:
 a mounting plate having an inlet port configured to be fluidly coupled to a source of fluid;
 a pilot supply valve mounted to the mounting plate, wherein the pilot supply valve comprises (i) an inlet port fluidly coupled to the inlet port of the mounting plate, and (ii) a first outlet port configured to be fluidly coupled to a pilot port of a main valve; and
 a pilot exhaust valve mounted to the mounting plate, wherein the pilot exhaust valve comprises (i) a vent port, (ii) a second outlet port that is fluidly coupled to the first outlet port of the pilot supply valve, wherein the valve assembly is configured to operate in:
 a first state at which the pilot supply valve allows a pilot fluid signal to flow from the inlet port to the first outlet port to actuate the main valve, while the pilot exhaust valve blocks fluid flow from the second outlet port to the vent port to allow the pilot fluid signal to flow to the pilot port of the main valve to actuate the main valve, and
 a second state at which the pilot supply valve blocks fluid flow from the inlet port to the first outlet port, while the pilot exhaust valve allows fluid flow from the second outlet port to the vent port to drain the pilot port of the main valve, thereby unactuating the main valve.

2. The valve assembly of claim 1, wherein the pilot supply valve further comprises: (i) a solenoid coil, (ii) an armature slidably accommodated within the solenoid coil, (iii) a magnet fixedly disposed within the solenoid coil, wherein the magnet applies a magnetic force on the armature in a distal direction, and (iv) a spring applying a biasing force on the armature in a proximal direction, wherein to operate the valve assembly in the first state, the solenoid coil is energized with a first signal having a first polarity, thereby causing a solenoid force to be applied to the armature in the distal direction, wherein a combination of the magnetic force and the solenoid force overcome the biasing force of the spring, causing the armature to move axially in the distal direction to a first position, thereby allowing the pilot fluid signal to flow from the inlet port to the first outlet port to actuate the main valve, and wherein when the armature is in the first position, the magnetic force of the magnet is greater than the biasing force of the spring, and the armature remains in the first position upon removal of the first signal.

3. The valve assembly of claim 2, wherein to operate the valve assembly in the second state, the solenoid coil is energized with a second signal having a second polarity opposite the first polarity, thereby causing a solenoid force to be applied to the armature in the proximal direction, wherein a combination of the biasing force of the spring and the solenoid force overcome the magnetic force, causing the armature to move axially in the proximal direction to a second position, thereby blocking fluid flow from the inlet port to the first outlet port, and wherein when the armature is in the second position, the magnetic force of the magnet is smaller than the biasing force, and the armature remains in the second position upon removal of the second signal.

4. The valve assembly of claim 1, wherein the pilot exhaust valve further comprises: (i) a solenoid coil, (ii) an armature slidably accommodated within the solenoid coil, (iii) a magnet fixedly disposed within the solenoid coil, wherein the magnet applies a magnetic force on the armature in a distal direction, and (iv) a spring applying a biasing force on the armature in a proximal direction, wherein to operate the valve assembly in the first state, the solenoid coil is energized with a first signal having a first polarity, thereby causing a solenoid force to be applied to the armature in the distal direction, wherein a combination of the magnetic force and the solenoid force overcome the biasing force of the spring, causing the armature to move axially in the distal direction to a first position, thereby blocking fluid flow from the second outlet port to the vent port to allow the pilot fluid signal to flow to the pilot port of the main valve, and wherein when the armature is in the first position, the magnetic force of the magnet is greater than the biasing force of the spring, and the armature remains in the first position upon removal of the first signal.

5. The valve assembly of claim 4, wherein to operate the valve assembly in the second state, the solenoid coil is energized with a second signal having a second polarity opposite the first polarity, thereby causing a solenoid force to be applied to the armature in the proximal direction, wherein a combination of the biasing force of the spring and the solenoid force overcome the magnetic force, causing the armature to move axially in the proximal direction to a second position, thereby allowing fluid flow from the second outlet port to the vent port to drain the pilot port of the main valve and unactuate the main valve, and wherein when the armature is in the second position, the magnetic force of the magnet is smaller than the biasing force, and the armature remains in the second position upon removal of the second signal.

6. A valve assembly comprising:
a mounting plate having an inlet port configured to be fluidly coupled to a source of fluid;
a pilot supply valve mounted to the mounting plate, wherein the pilot supply valve comprises (i) an inlet port fluidly coupled to the inlet port of the mounting plate, (ii) a first outlet port configured to be fluidly coupled to a pilot port of a main valve, (iii) a first solenoid coil, (iv) a first armature slidably accommodated within the first solenoid coil, (v) a first magnet fixedly disposed within the first solenoid coil, wherein the first magnet applies a magnetic force on the first armature in a distal direction, and (vi) a first spring applying a biasing force on the first armature in a proximal direction; and
a pilot exhaust valve mounted to the mounting plate, wherein the pilot exhaust valve comprises (i) a vent port, (ii) a second outlet port that is fluidly coupled to the first outlet port of the pilot supply valve, (iii) a second solenoid coil, (iv) a second armature slidably accommodated within the second solenoid coil, (v) a second magnet fixedly disposed within the second solenoid coil, wherein the second magnet applies a magnetic force on the second armature in the distal direction, and (vi) a second spring applying a biasing force on the second armature in the proximal direction.

7. The valve assembly of claim 6, wherein the valve assembly is configured to operate in a first state at which the first solenoid coil is energized with a first signal having a first polarity, thereby causing a solenoid force to be applied to the first armature in the distal direction, wherein a combination of the magnetic force and the solenoid force overcome the biasing force of the first spring, causing the first armature to move axially in the distal direction to a first position, thereby allowing a pilot fluid signal to flow from the inlet port to the first outlet port to actuate the main valve, and wherein when the first armature is in the first position, the magnetic force of the first magnet is greater than the biasing force of the first spring, and the first armature remains in the first position upon removal of the first signal.

8. The valve assembly of claim 7, wherein to operate the valve assembly in the first state, the second solenoid coil is energized with a respective first signal having the first polarity, thereby causing a solenoid force to be applied to the second armature in the distal direction, wherein a combination of the magnetic force and the solenoid force overcome the biasing force of the second spring, causing the second armature to move axially in the distal direction to a respective first position, thereby blocking fluid flow from the second outlet port to the vent port to allow the pilot fluid signal to flow to the pilot port of the main valve.

9. The valve assembly of claim 7, wherein the valve assembly is configured to operate in a second state at which the first solenoid coil is energized with a second signal having a second polarity, thereby causing a solenoid force to be applied to the first armature in the proximal direction, wherein a combination of the biasing force of the first spring and the solenoid force overcome the magnetic force, causing the first armature to move axially in the proximal direction to a second position, thereby blocking fluid flow from the inlet port to the first outlet port, and wherein when the first armature is in the second position, the magnetic force of the first magnet is smaller than the biasing force of the first spring, and the first armature remains in the second position upon removal of the second signal.

10. The valve assembly of claim 9, wherein to operate the valve assembly in the second state, the second solenoid coil is energized with a respective second signal having the second polarity, thereby causing a solenoid force to be applied to the second armature in the proximal direction, wherein a combination of the biasing force of the second spring and the solenoid force overcome the magnetic force, causing the second armature to move axially in the proximal direction to a respective second position, thereby allowing fluid flow from the second outlet port to the vent port to drain the pilot port of the main valve and unactuate the main valve, and wherein when the second armature is in the respective second position, the magnetic force of the second magnet is smaller than the biasing force of the second spring, and the second armature remains in the respective second position upon removal of the respective second signal.

11. A system comprising:
a main valve comprising: (i) a supply port configured to be fluidly coupled to a source of fluid, (ii) a reservoir port configured to be fluidly coupled to a reservoir of fluid, (iii) a first workport configured to be fluidly coupled to axle-lifting bags configured to lift a retractable axle of a vehicle when inflated, (iv) a second workport configured to be fluidly coupled to axle-lowering bags configured to lower the retractable axle of the vehicle when inflated, and (v) a pilot port, wherein the main valve is configured to operate in: (i) an unactuated state, when the pilot port is drained, at which the supply port is fluidly coupled to the first workport and the reservoir port is fluidly coupled to the second workport, thereby allowing the axle-lifting bags to be inflated, and (ii) an actuated state, when a pilot fluid signal is provided to the pilot port, at which the supply port is fluidly coupled to the second workport and the reservoir port is fluidly coupled to the first workport, thereby allowing the axle-lowering bags to be inflated;

a valve assembly comprising:
a mounting plate having an inlet port configured to be fluidly coupled to the source of fluid,
a pilot supply valve mounted to the mounting plate, wherein the pilot supply valve comprises (i) an inlet port fluidly coupled to the inlet port of the mounting plate, and (ii) a first outlet port fluidly coupled to the pilot port of the main valve, and
a pilot exhaust valve mounted to the mounting plate, wherein the pilot exhaust valve comprises (i) a vent port, (ii) a second outlet port fluidly coupled to the first outlet port of the pilot supply valve; and a controller configured to perform operations comprising:
operating the valve assembly in a first state at which the pilot supply valve allows the pilot fluid signal to flow from the inlet port to the first outlet port, while the pilot exhaust valve blocks fluid flow from the second outlet port to the vent port to allow the pilot fluid signal to flow to the pilot port of the main valve to operate the main valve in the actuated state, and
operating the valve assembly in a second state at which the pilot supply valve blocks fluid flow from the inlet port to the first outlet port, while the pilot exhaust valve allows fluid flow from the second outlet port to the vent port to drain the pilot port of the main valve to operate the main valve in the unactuated state.

12. The system of claim 11, wherein the pilot supply valve further comprises: (i) a solenoid coil, (ii) an armature slidably accommodated within the solenoid coil, (iii) a magnet fixedly disposed within the solenoid coil, wherein the magnet applies a magnetic force on the armature in a distal direction, and (iv) a spring applying a biasing force on the armature in a proximal direction, wherein operating, by the controller, the valve assembly in the first state comprises:
sending a first signal having a first polarity to the solenoid coil, thereby causing a solenoid force to be applied to the armature in the distal direction, wherein a combination of the magnetic force and the solenoid force overcome the biasing force of the spring, causing the armature to move axially in the distal direction to a first position, thereby allowing the pilot fluid signal to flow from the inlet port to the first outlet port to actuate the main valve, and wherein when the armature is in the first position, the magnetic force of the magnet is greater than the biasing force of the spring, and the armature remains in the first position upon removal of the first signal.

13. The system of claim 12, wherein operating, by the controller, the valve assembly in the second state comprises:
sending a second signal having a second polarity opposite the first polarity to the solenoid coil, thereby causing a solenoid force to be applied to the armature in the proximal direction, wherein a combination of the biasing force of the spring and the solenoid force overcome the magnetic force, causing the armature to move axially in the proximal direction to a second position, thereby blocking fluid flow from the inlet port to the first outlet port, and wherein when the armature is in the second position, the magnetic force of the magnet is smaller than the biasing force, and the armature remains in the second position upon removal of the second signal.

14. The system of claim 11, wherein the pilot exhaust valve further comprises: (i) a solenoid coil, (ii) an armature slidably accommodated within the solenoid coil, (iii) a magnet fixedly disposed within the solenoid coil, wherein the magnet applies a magnetic force on the armature in a distal direction, and (iv) a spring applying a biasing force on the armature in a proximal direction, wherein operating, by the controller, the valve assembly in the first state comprises:
sending a first signal having a first polarity to the solenoid coil, thereby causing a solenoid force to be applied to the armature in the distal direction, wherein a combination of the magnetic force and the solenoid force overcome the biasing force of the spring, causing the armature to move axially in the distal direction to a first position, thereby blocking fluid flow from the second outlet port to the vent port to allow the pilot fluid signal to flow to the pilot port of the main valve, and wherein when the armature is in the first position, the magnetic force of the magnet is greater than the biasing force of the spring, and the armature remains in the first position upon removal of the first signal.

15. The system of claim 14, wherein operating, by the controller, the valve assembly in the second state comprises:
sending a second signal having a second polarity opposite the first polarity to the solenoid coil, thereby causing a solenoid force to be applied to the armature in the proximal direction, wherein a combination of the biasing force of the spring and the solenoid force overcome the magnetic force, causing the armature to move axially in the proximal direction to a second position, thereby allowing fluid flow from the second outlet port to the vent port to drain the pilot port of the main valve and unactuate the main valve, and wherein when the armature is in the second position, the magnetic force of the magnet is smaller than the biasing force, and the armature remains in the second position upon removal of the second signal.

16. A vehicle comprising:
a retractable axle;
axle-lifting bags configured to lift the retractable axle when inflated;
axle-lowering bags configured to lower the retractable axle of the vehicle when inflated;
a source of fluid;
a reservoir of fluid;
a main valve comprising: (i) a supply port configured to be fluidly coupled to the source of fluid, (ii) a reservoir port configured to be fluidly coupled to the reservoir, (iii) a first workport configured to be fluidly coupled to the axle-lifting bags, (iv) a second workport configured to be fluidly coupled to the axle-lowering bags, and (v) a pilot port, wherein the main valve is configured to operate in (i) an unactuated state, when the pilot port is drained, at which the supply port is fluidly coupled to the first workport and the reservoir port is fluidly coupled to the second workport, thereby allowing the axle-lifting bags to be inflated, and (ii) an actuated state, when a pilot fluid signal is provided to the pilot port, at which the supply port is fluidly coupled to the second workport and the reservoir port is fluidly coupled to the first workport, thereby allowing the axle-lowering bags to be inflated;

a valve assembly comprising:
  a mounting plate having an inlet port configured to be fluidly coupled to the source of fluid,
  a pilot supply valve mounted to the mounting plate, wherein the pilot supply valve comprises (i) an inlet port fluidly coupled to the inlet port of the mounting plate, and (ii) a first outlet port configured to be fluidly coupled to the pilot port of the main valve, and
  a pilot exhaust valve mounted to the mounting plate, wherein the pilot exhaust valve comprises (i) a vent port, (ii) a second outlet port that is fluidly coupled to the first outlet port of the pilot supply valve; and a controller configured to perform operations comprising:
  operating the valve assembly in a first state at which the pilot supply valve allows the pilot fluid signal to flow from the inlet port to the first outlet port, while the pilot exhaust valve blocks fluid flow from the second outlet port to the vent port to allow the pilot fluid signal to flow to the pilot port of the main valve to operate the main valve in the actuated state, lowering the retractable axle, and
  operating the valve assembly in a second state at which the pilot supply valve blocks fluid flow from the inlet port to the first outlet port, while the pilot exhaust valve allows fluid flow from the second outlet port to the vent port to drain the pilot port of the main valve to operate the main valve in the unactuated state, lifting the retractable axle.

17. The vehicle of claim 16, wherein the retractable axle is a first retractable axle, the pilot supply valve is a first pilot supply valve, the pilot exhaust valve is a first pilot exhaust valve, the main valve is a first main valve, the vehicle further comprising:

a second retractable axle; and a second main valve, wherein the valve assembly further comprises:
  a second pilot supply valve mounted to the mounting plate downstream from the first pilot supply valve, and
  a second pilot exhaust valve mounted to the mounting plate, wherein the second pilot supply valve and the second pilot exhaust valve control flow of a respective pilot fluid signal to the second main valve based on signals from the controller to control lowering and lifting the second retractable axle.

18. The vehicle of claim 17, wherein the first pilot supply valve allows fluid from the source of fluid to flow therethrough to a respective inlet port of the second pilot supply valve, and wherein the second pilot supply valve precludes fluid from flowing downstream from the second pilot supply valve.

19. The vehicle of claim 18, wherein:

the first pilot supply valve comprises a first manifold comprising the inlet port and comprising a first channel that is fluidly coupled to the inlet port of the mounting plate such that that the first channel allows fluid flow therethrough downstream from the first pilot supply valve, and the second pilot supply valve comprises a second manifold comprising the respective inlet port and comprising a second channel that is fluidly coupled to the first channel of the first pilot supply valve, wherein the second channel is blocked to preclude fluid flow downstream therefrom.

20. The vehicle of claim 16, wherein the pilot exhaust valve comprises a porous plug disposed at the vent port, wherein the porous plug allows flow of pressurized fluid therethrough in a direction from within the pilot exhaust valve to an external environment of the pilot exhaust valve when the controller operates the valve assembly in the second state.

* * * * *